(12) United States Patent
Fournier et al.

(10) Patent No.: US 9,108,652 B2
(45) Date of Patent: *Aug. 18, 2015

(54) METHOD AND SYSTEM FOR TIMETABLE OPTIMIZATION UTILIZING ENERGY CONSUMPTION FACTORS

(71) Applicant: General Electric Company, Schenectady, NY (US)

(72) Inventors: David Fournier, Paris (FR); Denis Mulard, Paris (FR)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/168,645

(22) Filed: Jan. 30, 2014

(65) Prior Publication Data

US 2014/0180510 A1    Jun. 26, 2014

Related U.S. Application Data

(63) Continuation-in-part of application No. 13/676,279, filed on Nov. 14, 2012, now Pat. No. 8,670,890.

(60) Provisional application No. 61/669,230, filed on Jul. 9, 2012.

(51) Int. Cl.
  B61L 27/00   (2006.01)
  B61L 3/00   (2006.01)
  (Continued)

(52) U.S. Cl.
  CPC ............. B61L 27/0027 (2013.01); B61L 3/006 (2013.01); G05D 1/00 (2013.01); G08G 9/00 (2013.01); G06Q 10/04 (2013.01); G06Q 50/06 (2013.01)

(58) Field of Classification Search
  CPC ........ B61L 27/0027; B61L 3/006; G08G 9/00; G06Q 10/04; G06Q 50/06; G05D 1/00
  USPC .......................................................... 701/23
  See application file for complete search history.

(56) References Cited

U.S. PATENT DOCUMENTS 6,980,894 B1 * 12/2005 Gordon et al. .................. 701/20

FOREIGN PATENT DOCUMENTS

| EP | 2684761 A2 | 1/2014 |
| WO | 2003097425 A1 | 11/2003 |
| WO | 2012150143 A2 | 11/2012 |

OTHER PUBLICATIONS

Albrecht, "Reducing power peaks and energy consumption in rail transit systems by simultaneous train running time control", Computers in Railways IX, pp. 886-894, Wessex Institute of Technology, 2004.

(Continued)

*Primary Examiner* — Mary Cheung
*Assistant Examiner* — Yuen Wong

(57) ABSTRACT

Systems and methods for synchronizing two or more vehicles operating on an electric transportation line to optimize energy consumption. A controller is provided having a computer memory component storing a set of computer-executable instructions, a list of braking intervals, and a list of acceleration intervals for the vehicles. The controller also has a processing component configured to execute the set of computer-executable instructions to operate on the list of braking intervals and the list of acceleration intervals to minimize an energy consumption of the electric transportation line over a determined period of time by shifting acceleration intervals to synchronize with braking intervals. A dedicated heuristic greedy algorithm and an energy model are implemented in the controller as part of the computer-executable instructions to achieve the improved energy consumption.

20 Claims, 17 Drawing Sheets

(51) Int. Cl.
*G05D 1/00* (2006.01)
*G08G 9/00* (2006.01)
*G06Q 10/04* (2012.01)
*G06Q 50/06* (2012.01)

(56) References Cited

OTHER PUBLICATIONS

Chen et al., "Optimization of an MRT Train Schedule:Reducing Maximum Traction Power by Using Genetic Algorithms", IEEE Transactions on Power Systems, vol. 20, No. 3, Aug. 2005.

Kim et al., "A Mathematical Approach for Reducing the Maximum Traction Energy: The Case of Korean MRT Trains", IMECS, Mar. 17-19, 2010.

Nasri et al., "Timetable Optimization for Maximum Usage of Regenerative Energy of Braking in Electrical Railway Systems", SPEEDAM 2010 International Symposium on Power Electronics, Electrical Drives, Automation and Motion, pp. 1218-1221, 2010.

Kim et al., "A Model and Approaches for Synchronized Energy Saving in Timetabling", 9th World Congress on Railway Research May 22-26, 2011.

PCT Search Report and Opinion issued in connection with corresponding PCT Application No. PCT/ US2015/011972 on Mar. 26, 2015.

* cited by examiner

METHOD AND SYSTEM FOR TIMETABLE OPTIMIZATION UTILIZING ENERGY CONSUMPTION FACTORS

CROSS-REFERENCE TO RELATED APPLICATIONS

This patent application is a continuation-in-part patent application of U.S. patent application Ser. No. 13/676,279 filed on Nov. 14, 2012, which claims the benefit of U.S. Provisional Application Ser. No. 61/669,230, filed Jul. 9, 2012, and entitled "A METHOD AND SYSTEM FOR TIMETABLE OPTIMIZATION UTILIZING ENERGY CONSUMPTION FACTORS." The entireties of the aforementioned applications are incorporated herein by reference.

BACKGROUND

1. Technical Field

Embodiments of the subject matter disclosed herein relate to vehicle scheduling and control. Other embodiments relate to synchronizing two or more railway assets to optimize energy consumption.

2. Discussion of Art

In light of various economic and environmental factors, the transportation industry has strived for solutions regarding sustainable energy as well as, or in the alternative, energy conservation. Conventional solutions include hardware such as, for instance, fly-wheels or super batteries, which alleviate the sustainable energy and/or energy conservation. Such hardware can be costly not only for the specific cost of the hardware but the cost routine maintenance thereof.

It may be desirable to have a system and method for managing energy systems that differ from those that are currently available.

BRIEF DESCRIPTION

In one embodiment, a controller is provided. The controller includes a non-transitory computer memory component storing a set of computer-executable instructions, a list of braking intervals for a plurality of vehicles operating on an electric transportation line, and a list of acceleration intervals for the plurality of vehicles. The controller also includes a processing component configured to execute the set of computer-executable instructions to at least operate on the list of braking intervals and the list of acceleration intervals to reduce an energy consumption of the electric transportation line over a period of time by shifting one or more acceleration intervals of the list of acceleration intervals in time with respect to one or more braking intervals of the list of braking intervals.

In one embodiment, a method is provided. The method includes receiving a timetable in a controller, where the timetable is associated with a time schedule of braking intervals and acceleration intervals for a plurality of vehicles operating on an electric transportation line. The method also includes generating an energy model using the controller, where the energy model is associated with the timetable and relates to how regenerative energy is transferred throughout the electric transportation line. The method further includes synchronizing one or more of the braking intervals of the plurality of vehicles with one or more of the acceleration intervals of the plurality of vehicles during a period of time of operation of the plurality of vehicles on the electric transportation line by shifting the one or more acceleration intervals in time, using the controller, based at least in part on the energy model.

In one embodiment, a system is provided. The system includes a controller configured to process a list of braking intervals and a list of acceleration intervals associated with a plurality of vehicles configured to operate on an electric transportation line to determine shifts in time of one or more of the acceleration intervals with respect to one or more of the braking intervals that result in a reduced consumption of energy by the electric transportation line over a period of time. The system also includes a communication component configured for operable coupling with the controller and to control communication of the shifts in time determined by the controller to the vehicles, for controlling movement of the vehicles.

In one embodiment, a method is provided. The method includes processing, with a controller, a list of braking intervals and a list of acceleration intervals associated with a plurality of vehicles configured to operate on an electric transportation line to determine shifts in time of one or more of the acceleration intervals with respect to one or more of the braking intervals that result in a reduced consumption of energy by the electric transportation line over a period of time. The method also includes communicating to the vehicles, with a communication component operably coupled to the controller, information of the shifts in time determined by the controller, for controlling movement of the vehicles.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
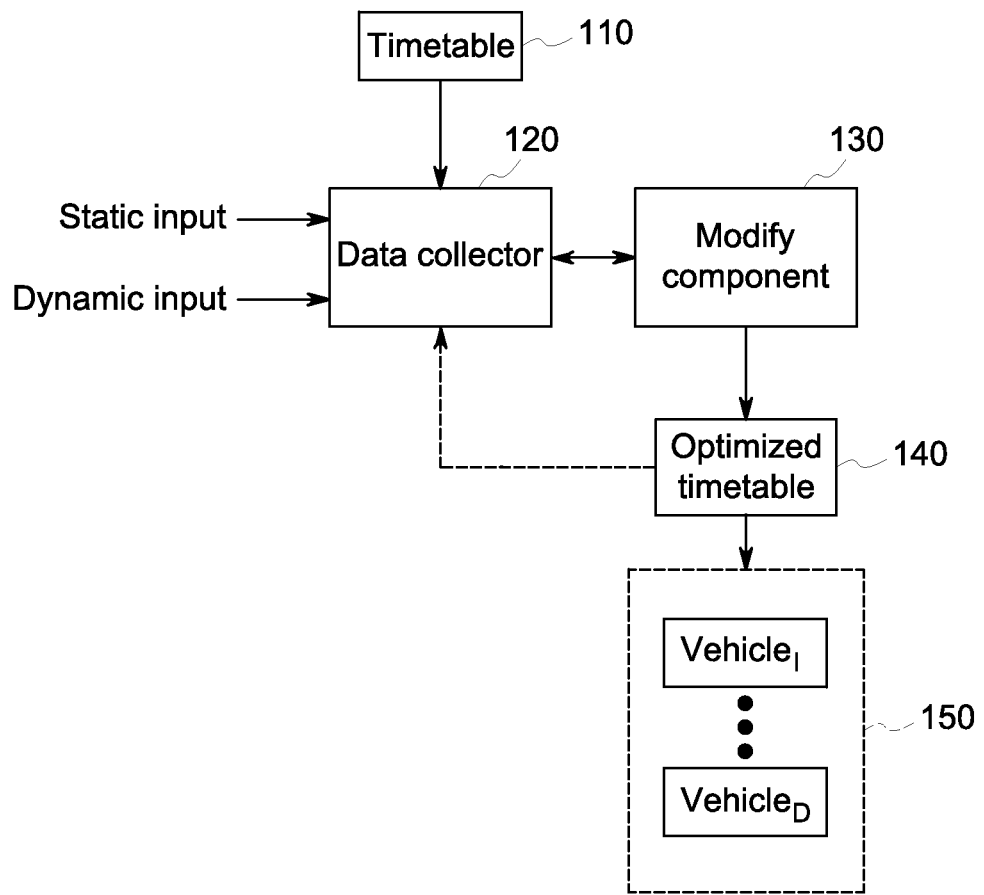
FIG. 1 is an illustration of an embodiment of a system for optimizing energy consumption by synchronizing a first vehicle and a second vehicle.

Embodiments of the present invention relate to methods and systems for synchronizing two or more vehicle (e.g., railway, among others) assets to optimize energy consumption. A timetable associated with two or more vehicles and at least one terminal can be received. The timetable can be modified to create a modified timetable that overlaps a brake time for a first vehicle and an acceleration time for a second vehicle, wherein at least one of a departure time or a dwell time is modified. Furthermore, the second vehicle can transfer energy from the first vehicle based upon at least one of the modified timetable and the brake time overlapping with the acceleration time.

With reference to the drawings, like reference numerals designate identical or corresponding parts throughout the several views. However, the inclusion of like elements in different views does not mean a given embodiment necessarily includes such elements or that all embodiments of the invention include such elements.

The term "vehicle" as used herein can be defined as any asset that is a mobile machine that transports at least one of a person, people, or a cargo. For instance, a vehicle can be, but is not limited to being, a truck, a rail car, an intermodal container, a locomotive, a marine vessel, a mining equipment, a stationary power generation equipment, an industrial equipment, a construction equipment, and the like.

It is to be appreciated that "associated with the two or more vehicles" refers to relating to one or more of the two or more vehicles.

FIG. 1 is an illustration of an exemplary embodiment of a system 100 for optimizing energy consumption by synchronizing a first vehicle and a second vehicle. The system includes a timetable 110 associated with a first vehicle, a second vehicle, and a terminal, wherein the timetable is a schedule of a time that the first vehicle and the second vehicle are at least one of arriving or departing the terminal. The time table can be aggregated by a data collector 120. Moreover, the data collector 120 can aggregate a static input and/or a dynamic input (discussed below). The system further includes a modify component 130 that optimizes the timetable 110 based upon the aggregated information and adjusts (e.g., modifies) at least one of a dwell time for a vehicle located within a terminal, a departure time for a vehicle located within a terminal, and/or a speed profile for a vehicle for a terminal. The modify component 130 generates an optimized timetable 140 (also referred to as the modified timetable), wherein the optimized timetable 140 improves energy consumption.

For example, the optimized timetable synchronizes two or more vehicles located within a terminal such that while a vehicle is braking, another vehicle is accelerating. In particular, synchronizing a first braking vehicle with a second accelerating vehicle allows a portion of energy to transfer from the first braking vehicle to the second accelerating vehicle. The system provides synchronization for two or more vehicles without any additional hardware such as super capacitors, fly-wheels, among others. The system can be computer-implemented via software such that the modify component adjusts a timetable to create the optimized timetable.

The optimized timetable or modified timetable can be implemented to two or more vehicles 150 (herein referred to as "vehicles 150"). There can be a suitable number of vehicles such as vehicle$_1$ to vehicle$_D$, where D is a positive integer. In particular, the vehicles can be automatically controlled, manually controlled (e.g., a human operator), or a combination thereof. In either event, the optimized timetable can be implemented, wherein at least one of a dwell time, a departure time, and/or a speed profile is adjusted to synchronize the vehicles. By way of example and not limitation, the vehicle can be a train, a railway vehicle, an electrical-powered vehicle, and the like.

As discussed, the system can include the data collector. The data collector can aggregate information related to a timetable, a static input, and/or a dynamic input (See DATA below). For instance, the data collector can aggregate suitable data related to the timetable, two or more vehicles, a terminal (e.g., a location, a station, etc.), and the like. By way of example and not limitation, the dynamic input can be a dwell time, a departure time, a speed profile, a portion of a timetable, among others. Moreover, for example, the static input can be, but is not limited to, a Quality of Service (QoS) constraint, a constraint, an energy model, a tolerance, an energy profile, a network topology, an electric efficiency, an origin/destination matrix, a portion of a timetable, an energy transportation, a loss of energy, among others. The static input and/or the dynamic inputs are described in more details below.

By way of example and not limitation, the system can create a timetable to provide synchronization between two or more vehicles. For instance, a timetable can be created which takes into account at least one of a security constraint, a quality of service constraint, the issue of energy consumption, and the like. In another example, the system can optimize an existing timetable for two or more vehicles. In another example, the system 100 can create a timetable for two or more vehicles as well as optimize an existing timetable for two or more disparate vehicles. For instance, two stations or terminals can include a set of vehicles respectively. The first set of vehicles for a first station can include an existing timetable that the system can modify or adjust to improve synchronization. Further, a timetable can be created for the second set of vehicles related to a second station.

Figure 2:
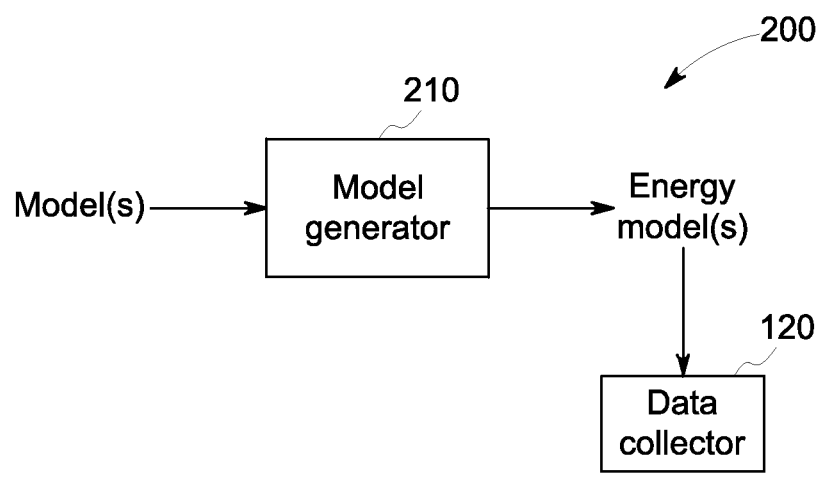
FIG. 2 is an illustration of an embodiment of a system for generating an energy model utilized to synchronize a brake time for a vehicle and an acceleration time for a vehicle.

FIG. 2 is an illustration of an exemplary embodiment of a system 200 for generating an energy model utilized to synchronize a brake time for a vehicle and an acceleration time for a vehicle. The system can include a model generator 210 that creates energy model(s) that can be collected by the data collector and further utilized by the modify component (not shown). The model generator can create a suitable model or a model with a suitable aspect to implement the optimized timetable to synchronize two or more trains for energy conservation. The below models and generation of such models are solely for example and not to be seen as limiting on the subject innovation (See MODEL ENERGY below).

The model generator can receive a model that represents a condition or characteristic associated with an environment in which two or more vehicles will be synchronized for energy conservation. For instance, the model can be or related to, but is not limited to, energy accountings, network topologies, energy transportation, ohmic resistance loss, among others. These models can be utilized to create an energy model for an environment in which two or more trains are to be synchronized with an optimized timetable by adjusting at least one of a dwell time, a departure time, and/or a speed profile.

Figure 3:
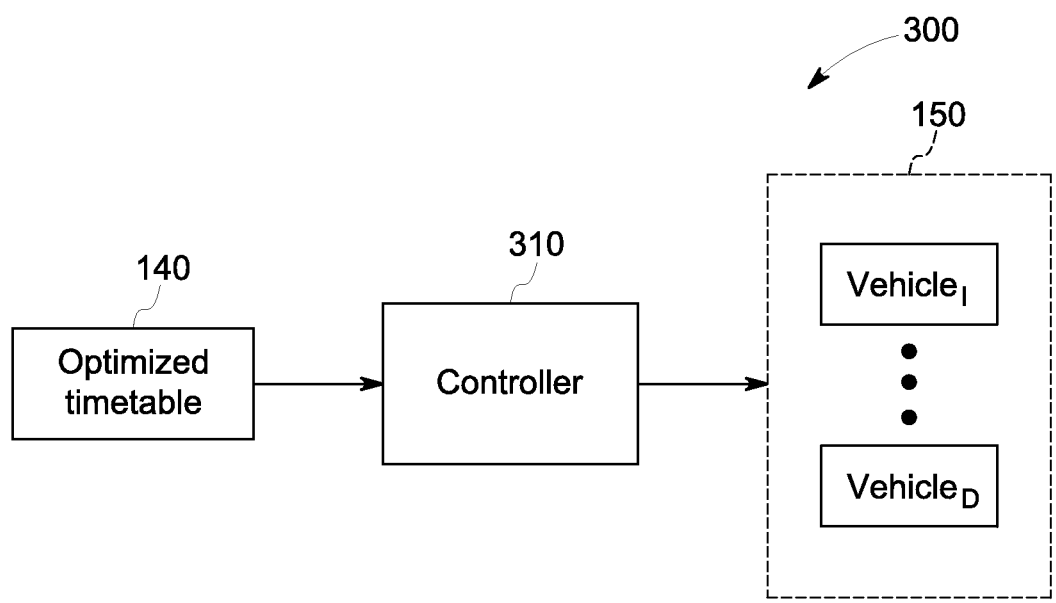
FIG. 3 is an illustration of an embodiment of a system for controlling two or more vehicles based upon an optimized timetable that conserves energy by synchronizing a first vehicle and a second vehicle.

FIG. 3 is an illustration of an exemplary embodiment of a system 300 for controlling two or more vehicles based upon an optimized timetable that conserves energy by synchronizing a first vehicle and a second vehicle. The system includes a controller 310 that can implement a control to the vehicles 150 based at least in part upon the generated optimized timetable. For instance, the controller can identify a change in a currently used timetable compared to the optimized timetable and implement such change. For instance, the controller can implement a new dwell time, a new departure time, and/or a new speed profile.

The controller can be utilized for an automatically driven vehicle (e.g., no human operator) as well as, or in the alternative, a human operated vehicle, or a combination thereof. For instance, the controller can include an automatic component (not shown) that will directly implement controls based upon a change identified in the optimized timetable. Furthermore, the controller can include a manual component (not shown) that can utilize a notification component (not shown) and/or a buffer component (not shown). The manual component can facilitate controlling a vehicle that is operated by a human. The notification component can provide a signal, a message, or an instruction to the human operator. For instance, the notification component can provide an audible signal, a visual signal, a haptic signal, and/or a suitable combination thereof. The buffer component can further include a buffer of time that can take into account a delay that occurs from a human operator receiving a notification and implementing such notification. For example, the buffer component can mitigate human delay to implement the optimized timetable.

Figure 4:
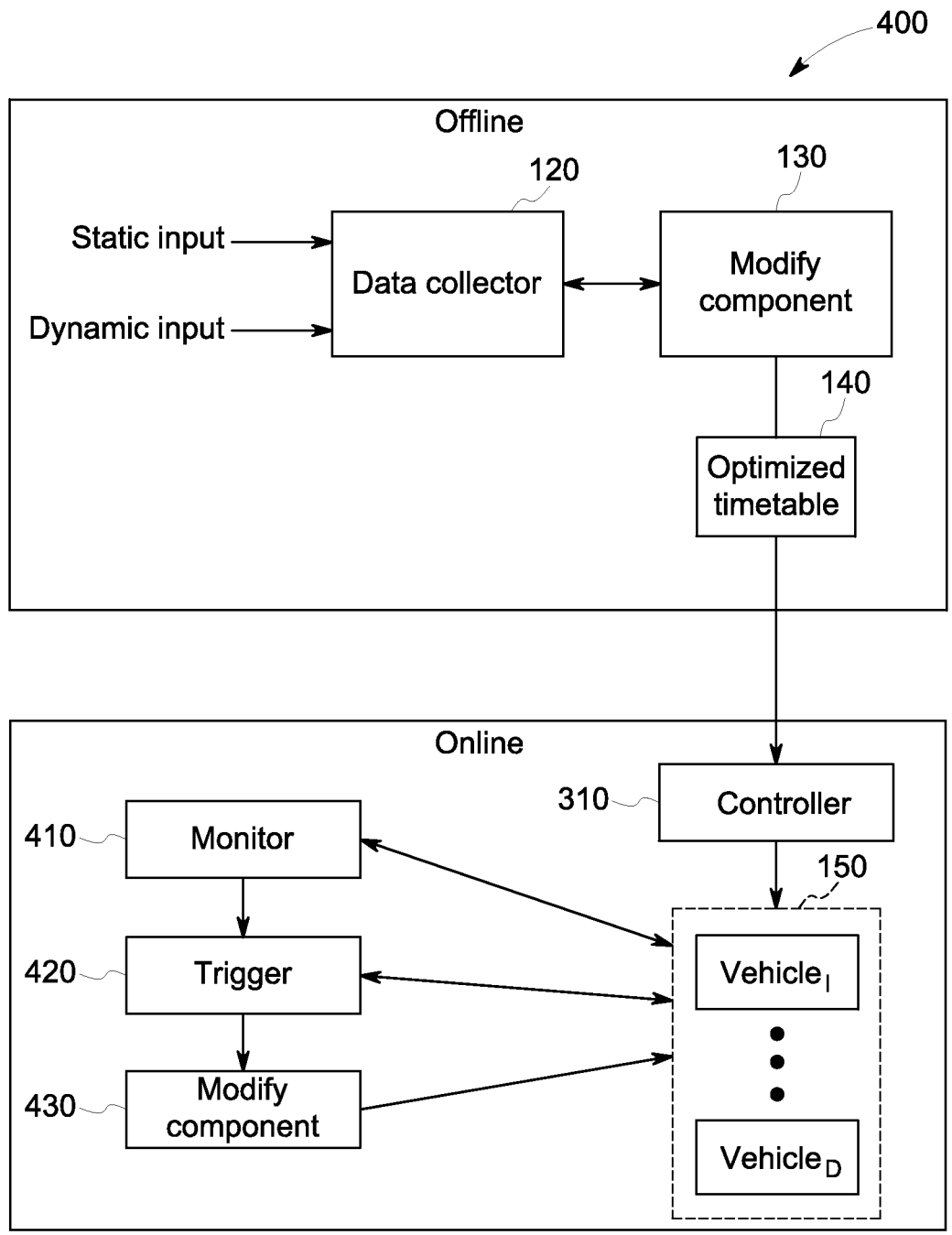
FIG. 4 is an illustration of an embodiment of a system for creating an optimized timetable offline and employing such optimized timetable online to conserve energy by synchronizing a first vehicle and a second vehicle.

FIG. 4 is an illustration of an exemplary embodiment of a system 400 for creating an optimized timetable offline and employing such optimized timetable online to conserve energy by synchronizing a first vehicle and a second vehicle. The system 400 can include an offline mode (also referred to as "offline") and an online mode (also referred to as "online"). An offline mode can indicate a test environment or a modeled environment and an online mode can indicate a real time, real physical world environment. For instance, a real terminal station with vehicles can be an online environment whereas a computer simulation can be an offline environment.

The system 400 allows a creation of an optimized timetable offline. Once the optimized timetable is created offline, the optimized timetable can be employed online. In particular, the controller can leverage the optimized timetable and implement specifics related thereto with vehicles. The online environment (also referred to as "online") can include a monitor 410, a trigger 420, and/or a modify component 430. The monitor can track the vehicles in comparison with at least one of the optimized timetable and/or a measured amount of energy (e.g., energy conserved, energy consumed, energy transferred, among others). The trigger can include threshold values or triggers that will indicate whether or not the modify component will be utilized to update the optimized timetable based on the tracked information.

The following is a description related to energy optimization of metro timetables.

Sustainable energy has been a major issue over the last years. Transportation is a major field concerned about energy consumption and the trend is to tend to optimize as much as possible the energy consumption in this industry, and in particular in mass rapid transit such as metros. Several hardware solutions, like fly-wheels or super batteries have been developed to reduce losses. However, these solutions involve buying and maintaining potentially costly material which can be difficult to economically justify.

This application can describe a method which modifies dwell times to synchronize acceleration and braking of metros. Dwell times have the advantage to be updated in real time. To do that, a genetic algorithm is used to minimize an objective function—corresponding to the global energy consumption over a time horizon—computed with a linear program.

The energy consumption in a metro line can be decreased by synchronizing braking and accelerations of metros. Indeed, an electric motor behaves as a generator when braking by transforming the kinetic energy into electrical energy. This energy, available in the third rail, has to be absorbed immediately by another metro in the neighborhood or is dissipated as heat and lost. The distance between metros which are generating energy and candidate metros induces that part of the transferred regenerative energy is lost in the third rail due to Joule's effect.

Most of the timetables do not take into account energy issues. The tables usually have been created to maximize quality of service, security and other constraints like drivers' shift or weekend periods for instance. It is however possible to slightly modify current timetables to include some energy optimization. Here, energy consumption of a metro line can be minimized during a given time horizon by modifying the off-line timetable.

As an example, the model can be restricted to a single metro line (no fork or loops) including 31 stations with two terminals A and B. All trips are done from A to B or B to A, stopping at all stations. The timetable, based on real data, is a bit more detailed than the one given to passengers; in addition to departure times at every station, it compiles also: 1) running times between every station; and 2) dwell times at every station.

Dwell times represent the nominal waiting time of a metro in a given station. This time can be different regarding the stations but it is considered here that every metro have the same dwell time for a given station, not depending on the hour of the day.

For every timeslot (1 second in our model), the position of metros (between which stations they are) is known and the energy they consume (positive energy or produce (negative energy). Contrary to timetables data which are real, energy data have been created following energy models. Units can be arbitrary: a value of 1 in this system corresponds to the energy consumed by a metro at full throttle during one second. Losses due to Joule's effect are compiled in an efficiency matrix. It details the percentage of energy which can be transferred from a point to another point in the line.

The objective (1) is to minimize the energy consumption over a given time period, thus to minimize the sum of energy consumptions over every timeslot. If T is considered the set of timeslots and $y_t$ the energy consumption of the line at timeslot t, then the objective function is:

$$\min \sum_{i \in T} y_t \quad (1)$$

The better use of regenerative energy can prevent the client investing in costly solutions like changing this. The computation of $y_t$ can be seen as a formulation of a generalized max flow problem which can be formulated as an LP problem. The minimization of the objective function is done by modifying only dwell times to shift schedules slightly and to synchronize in better way accelerations and braking.

As global energy consumption is optimized by modifying dwell times, the need to clarify what are the relevant dwell time for the formulation arises. The dwell times are computed as follows:

Sets
... T: timeslots,
... I: metros,
... S: stations,
... $D^r \subset I \times S$: relevant dwell times.

Parameters
... $Dep_{i,s}$: arrival time $t \in T$ of $i \in I$ to the station $s \in S$.
... $D_{i,s}$: dwell time of i, $s \in D^r$,
... $\delta$: minimal quantity for delaying/speeding up a dwell time.

Variables
... $d_{i,s}$: optimized dwell time of metro $i \in I$ at station $s \in S$.
... $n_{i,s} \in \mathbb{Z}$: number of times $\delta$ is applied to a dwell time i,s.

Model $$d_{i,s} = D_{i,s} + n_i \delta \qquad (2)$$

$$\text{with } D^r = \{(D \in I \times S / \inf(T) \leq Dep_{i,s} \leq \sup(T)\} \qquad (3)$$

Then these are the dwell times $d_{i,s} \in D^r \subset I \times S$ that the genetic algorithm will modify to minimize the objective function. Note that n can be unbounded. In the model, it is however bounded by small integers to stick on the quality of service issue and to keep having an invisible optimization for the final user.

Modifying dwell times involves a new synchronization between metros. Every iteration of the genetic algorithm can be computed, resulting in an objective function. As explicated in (1), every timeslot represents an independent problem. The issue here is that it is hard to know exactly how regenerated energy will spread throughout third rail and other metros. Some models take as an hypothesis that metros can transfer entirely their regenerative energy to other only if they belong to the same electric sub-section. The hypothesis here is that energy is dissipating proportionally to the distance between two metros. Also, the hypothesis here is that the energy is spread in an optimal way, i.e. the model minimizes the loss of energy. Then, for a given timeslot there is:

Sets
... $I^+$: metros consuming energy,
... $I^-$: metros producing energy.

Parameters
... $E_i^+$: energy consumed by metro $i \in I^+ (>0)$.
... $E_i^-$: energy produced by metro $i \in I^- (<0)$.
... $A_{i,j}$: proportion of the energy produced by $i \in I^-$ transferable to $j \in I^+$ due to Joule's effect.

Variables
... $x_{i,j}$: proportion of the energy produced by $i \in I^-$ transferred to $j \in I^+$.

Model $$\text{minimize } y \qquad (4)$$

$$\text{subject to } \sum_i^{I^+} E_i^+ + \sum_i^{I^-} \left( E_i^- \cdot \sum_j^{I^+} x_{i,j} \cdot A_{i,j} \right) \leq y \qquad (5)$$

$$\sum_j^{I^+} x_{i,j} \leq 1 \, \forall \, i \in I^- \qquad (6)$$

$$-\sum_i^{I^-} x_{i,j} \cdot E_i^- \cdot A_{i,j} \leq E_j^+ \, \forall \, j \in I^+ \qquad (7)$$

$$x_{i,j} \geq 0 \, \forall \, i \in I^-, \, \forall \, j \in I^+ \qquad (8)$$

$$y \geq 0 \qquad (9)$$

The LP model minimizes the energy consumed by spreading the energy produced in such a way $-\Sigma_i^{I^-}(E_i^- \cdot \Sigma_j^{I^+} x_{i,j} \cdot A_{i,j})$ is maximized. Note that (9) prevents the energy to be less than 0 at a given timeslot. It is because it is considered that the regenerative energy which is not utilized immediately is lost.

By modifying only slightly the dwell times, it is considered that the algorithm never reaches non satisfiability (not satisfied) as it is stayed in tolerable intervals, e.g. for headways. Every individual in the population is represented by a two-arrays table with metros in rows and stations in columns. Each cell represents a dwell time. Starting with initial dwell times, a population is created made of 100 individuals. Then every dwell time is randomized within a predefined domain, e.g. f−3s, 0s, +3s, +6s, +9sg. Finally every iteration, individuals are classified according to their objective function and selected. A crossover and mutation can be applied to them until convergence.

The model has been tested with a one-hour time horizon, corresponding to 3600 timeslots, 29 metros and 495 dwell times to optimize. The objective function has a value 8504 a.u. at time t0. After 450 iterations, total energy consumption is only 7939.4 a.u, that is to say 6.6% saving. The computation lasts over 88 hours long on a Intel Core 2 1.86 GHz Linux PC. As this optimization is to minimize an off-line timetable, it can be allowed.

A real metro line is subject to minor disturbances that can affect the adherence to the timetable. To check the relevance of the optimization, there can be added a random noise on optimized dwell times to quantify the robustness of the objective function. This noise consists in randomly modifying dwell times by $\pm \delta_s$.

TABLE 1

Alteration of the objective function according to noise

| | Noise (s) | | |
|---|---|---|---|
| | 1 | 3 | 6 |
| Average on 100 tries (u.a.) | 7964.9 | 7995.7 | 8028.4 |
| Saving (%) | 6.3 | 6.0 | 5.6 |

Table 1 shows the results. It can be seen that even with 6 second noise (corresponding to 2 intervals of modification from time of parking/stationary), the objective function is still saving 5.6% energy. This means that the optimized solution is saving energy, but also all its neighbor solutions are saving energy.

This resolution method to optimize the energy consumption in a metro line seems promising and deserves more research. In particular, it is wanted to increase the number of parameters that can be modified, such as departure times in terminals or speed profiles. Effort can be made to also compare these results with other methods such as constraint programming. Eventually, decreasing computation time can allow this method to be used in a real-time context, in particular when it is about to optimize energy consumption after major incidents.

The following is a description related to a data model for energy optimization.

The following provides a comprehensive overview of the different data needed to formalize a model representing the energy consumption of trains and/or vehicles. It gives also a possible formulation of the model itself regarding the given data as well as different approaches for representing as best, and taking into account time computation, the energy consumption.

The invention can be a software system used to decrease energy consumption in a metro line. This system allows a better synchronization of accelerating and braking metros, optimizing the use of regenerative energy produced by metros when braking.

The subject innovation uses as input the current timetable of a line. Including all possible regulation constraints like headways, the subject innovation modifies dwell times, departures times and possibly speed profiles in a transparent way for the user. Indeed, the subject innovation takes into account quality of service by only slightly modifying the different parameters of the trip. To decrease energy consumption, the subject innovation has energy data of trains (their energy profile) as well as the topology of the line (how do electric sub stations work) to optimize train patterns. The output of the subject innovation, embedded in ATS, is a new version of the timetable, that looks like the old one but which is energy optimized.

The subject innovation allows optimizing the use of regenerative energy due to braking metros (vehicles, trains, etc.). Indeed, if the regenerative energy is not consumed immediately by another metro in the line (if there is no other solutions like reversible electric sub stations or super capacitors), then this energy is lost as heat in the third rail. The regenerative energy, even if it does not decrease directly the overall energy consumption, permits to use less energy to start another metro which needs energy at the same time. Then the optimized reuse of regenerative energy indirectly decreases the total energy consumption.

The better use of regenerative energy can prevent the client investing in costly solutions like changing his electric substations into reversible ones or embedding batteries in metros. The software approach as well as the minimal impact on quality of service can be seen by the client as a "free" optimization, because he can save energy just by clicking on a button "optimize", and not by adding new devices on his line.

Conventional techniques provide different solutions to attempt to use the regenerative energy such as, but not limiting to, powering the air conditioning system in metros, charging embedded batteries, powering flywheels for later use, charging embedded super capacitors, supplying reversible electric substations, among others.

The subject innovation further includes a graphic user interface (GUI) that allows setting parameters of optimization in real time to make a system or metro line more efficient. The GUI can allow selection between optimized or actual timetables when perturbations occur.

This model can be used to minimize the energy consumption of trains over a period of time by software means. The optimization would indeed be done modifying the dwell times and departures at terminals and/or speed profiles. This optimization solution would be part of the solution of creating timetables and in another time, would be implemented for optimizing energy during real time regulation.

Data

The following is a description of the data utilized by an optimization model. To formulate a model accurate enough to forecast the gain in energy a fine optimization of timetables can perform, one needs the relevant data to do so. These data might be retrieved from a real case or made up internally, knowing the more realistic the data, the more relevant the optimization. The following is an example of date and is not to be limiting on the subject application.

The data can be at least one of the following: feasible timetable (including departures/arrivals of stations/terminals, dwell times, train patterns/trips linking, stabling/unstabling pattern, etc.); energy profiles (depending on charge of train/vehicle, type of rolling stock, speed profile, etc.); electric network topology; electric efficiency of equipment; tolerances (for degrees of freedom, quality of service constraints, feasibility constraints, etc.); and origin/destination matrix.

All data such as energy profiles, timetable scheduled hours and other including a time precision should be standardized. This precision will be chosen regarding different terms: precision of real systems; computing space available; and/or need for good precision for optimization. In an embodiment, the optimization and model can be discretized (e.g., discrete model) and not continuous.

Timetable

The optimization of the energy consumption in a metro line can be done on an already made timetable. The optimization can be a modification of several parameters of an initial timetable which minimizes the energy consumption and not a creation "from scratch" of a timetable considering energy issues. However, several possibilities are open to get this timetable.

The timetable can be fully given, that is to say that it gives the departure times of every trip at every stop. This is typically the timetable given to passengers for information in railroad but not in mass transit, where the timetable is mostly given in terms of periodicity (e.g. every 2 minutes). In addition, the optimization needs the information about stabling/unstabling trains at terminals as well as rolling stock types, speed profiles associated to every trip.

It can be given as well a map of departure times at terminals in addition with running times and dwell times at every station, those giving a full timetable when computed together. The information about stabling/unstabling and rolling stocks is still needed though.

Energy Profile

The energy model cannot be done without knowing exactly what are the energy consumption as well as the regenerative energy of the trains. The energy profile is however dependent to a lot of factors and several profiles—or at least a way to deduce several scenarios from a general profile—are needed.

It is easier to move a train when empty than in peak hours when full of people. That is why one should have different charge-dependent energy profiles. It is also possible to have a charge-dependent rate which would be multiplied to an empty charge energy profile to get trains energy profiles dependent of their charge.

Every type of train have different energy pattern, regarding their engine efficiency and their possible capability to provide regenerative energy, which can be taken into account.

Most of timetabling software takes into account different speed profiles for a train. For instance, one can drive a train at normal, fast or economic speeds. These speed profiles can imply substantially similar amount of energy profiles.

Electric Efficiency

There is a difference between the input energy and the useful energy—i.e. the kinetic energy of the train—because real devices are never 100% efficient.

Every wire, catenary, third rail or any other cable have an internal resistance different of zero. This data can be crucial: it is important to know the losses over cables as it would change the amount of regenerative energy a train is able to supply to another one. For instance, supplying a train at terminal B with the regenerative energy of a train braking in terminal A is not possible regarding the lineic resistance.

In the same spirit, transformers and other electric devices (such as rolling stock) have a particular efficiency which has to be taken into account.

Network Topology

Regarding the topology of the electric network of the metro line, it might not be possible to do several actions. It is important to know, over a particular example, if it is physically possible to, for instance, link directly to electrical points.

The network can possibly be divided into electric sections which may be independent. By doing so, the trains are forced to supply other trains with regenerative energy only if they are in the same section, being unable to supply electricity in other sections if they are isolated.

One has to consider the maximum amount of energy cables and equipment are able to withstand without deterioration. It is particularly important regarding the issues of maximum traction energy: a peak of energy occurring at a given time which can be above a certain limit.

Tolerances

The tolerances are the levers which can be pulled to optimize the energy consumption. It has been chosen that the energy optimization would be done only by modifying the timetable, and not using hardware means such as fly wheels or embedded batteries. The tolerances given by the data will most likely be the acceptable intervals where the quality of service is not impacted.

These parameters are the ones the optimization can directly modify to minimize the overall energy consumption.

The stops in every station, normally given in the initial timetable, will be modified for optimizing the timetable. Regarding initial dwell times, one will be able to shorten or lengthen them in a certain amount given by tolerances. To not impact on quality of service, it will be also necessary to take care of a global shift all along a trip. For instance, every dwell time of a 20-station trip can be shortened by 5 seconds but the global shifting can't be greater than 50 seconds (10 dwell times shortened).

Similarly to dwell times, departure times can be shortened or lengthened depending on the need of the optimization. The main difference is that departure times might be shifted inside bigger intervals as the departure time affects much less the quality of service (nobody is waiting in the train at this moment).

Speed profiles can be adjusted or modified to optimize the timetable (discussed above).

These parameters are the ones the optimization will indirectly modify as they are dependent to ones the optimization can directly modify. These constraints can be unsatisfied during the process of optimization but the final optimized timetable must satisfy all the constraints, or the timetable will be considered unfeasible.

The commercial speed represents the time a train is taking to go from its departure terminal to its arrival. Optimizing timetables shouldn't affect too much this commercial speed. Whereas departure times don't affect it, dwell times do. Indeed, if a train is delayed by 10 seconds at one station but sticks to the timetable at the rest of its trip, then its commercial speed will be lengthened by 10 seconds.

Figure 9:
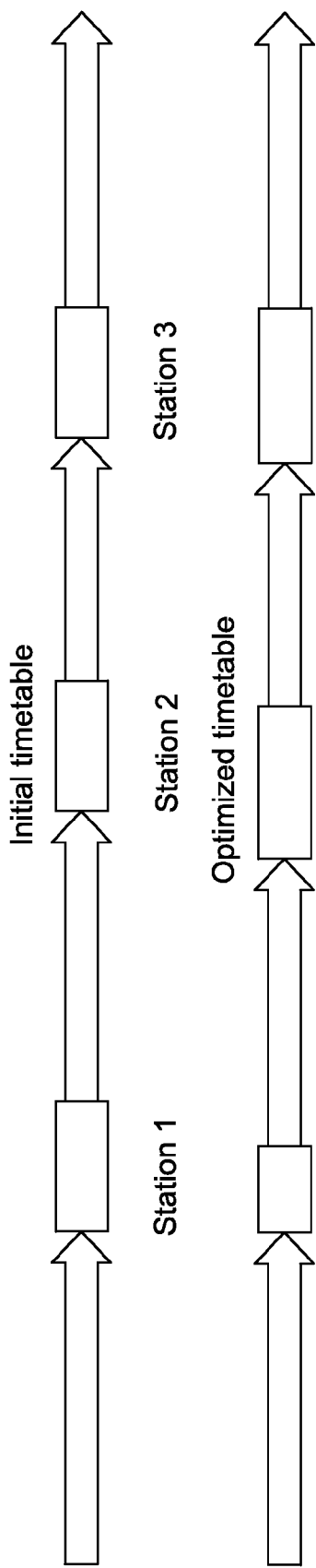
FIG. 9 illustrates an initial timetable and an optimized timetable.

One has thus to take care of the commercial speed of trains, for instance by balancing the delays of trains; if a train is delayed at a station, it may leave earlier another station (see FIG. 9). FIG. 9 illustrates an initial timetable and an optimized timetable, wherein as first dwell time is shortened in the optimized timetable, others have to be lengthened to respect commercial speed.

The distance (or time) between two trains is crucial in terms of security—when the headway is too short—and in terms of quality of service when it gets too long. The headway is obviously directly modified by the modification of dwell times; one has to know the limits of modification of these.

Figure 10:
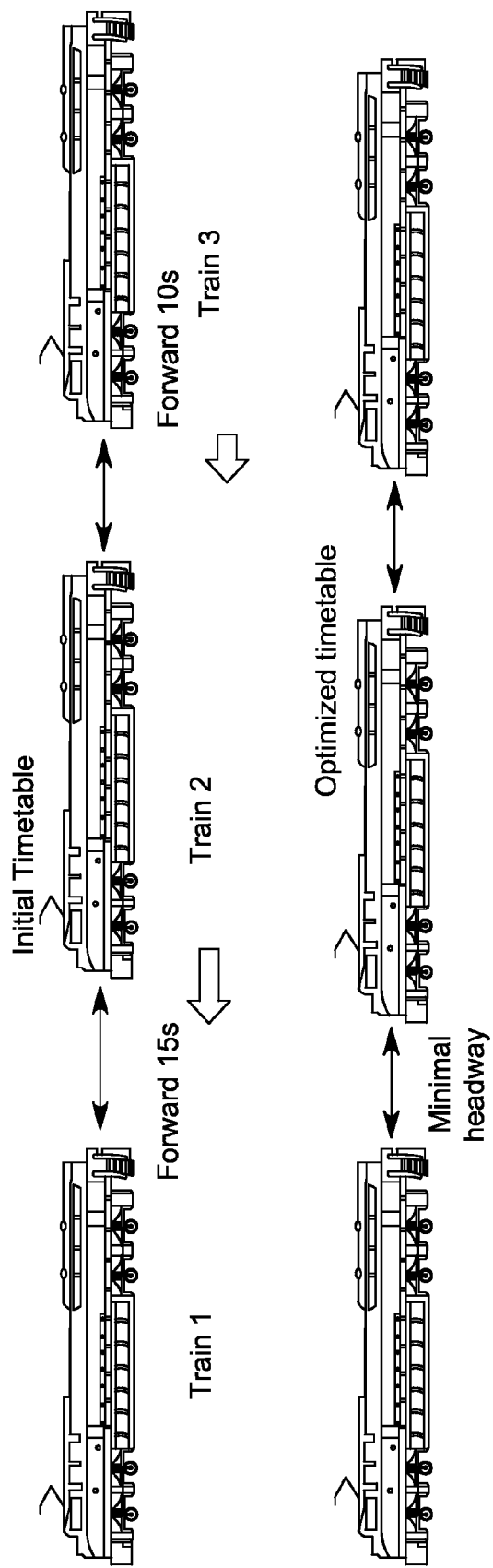
FIG. 10 illustrates a first train timetable and a second train timetable.

Headways imply two kinds of tolerances: local and global. The local tolerance forces the headway to be within an interval centered on the initial headway (e.g. ±10%). The global tolerance acts as a "balance" between different headways. Indeed, to not degrade too much the quality of service, headways have to be not too different from each other to not create gaps between trains as shown in FIG. 10. FIG. 10 illustrates Train 1 and Train 2, wherein Train 2 is delayed to optimize energy consumption and pulls train 3 which is delayed as well. To understand it, one can imagine that every train is linked to others with a spring. If a train is delayed, then it pulls on other springs and other trains are delayed as well.

Different constraints are occurring in terminals which have to be taken into account for testing the feasibility of the timetable. Usually, only a limited amount of trains can take the actions of stabling, unstabling or returning in the same time at a particular terminal.

Origin/Destination Matrix

This 3 dimension matrix represents the number of people going from a station to another in function of time as shown in Table A. It will be useful in some model refinements to formulate penalties on certain moves for optimization. For instance, a station which is considered as strongly used by passengers won't likely have its dwell time changed compared to another station where few people stop. The origin/destination matrix can be delivered with an approximation of the amount of people using metros at each station. This refinement is of course to avoid degrading the quality of service.

The matrix may be used in future development for testing the robustness of the optimization, by introducing perturbations within the matrix and verifying that the optimization remains intact.

TABLE A

Origin/Destination matrix for a 10 minute section of 5 stations

| stations | Number Of people | 1 | 2 | 3 | 4 | 5 | |
|---|---|---|---|---|---|---|---|
| 1 | 2145 | 0 | 20 | 36 | 22 | 22 | 100 |
| 2 | 1287 | 10 | 0 | 23 | 30 | 37 | 100 |
| 3 | 564 | 31 | 19 | 0 | 33 | 17 | 100 |
| 4 | 3780 | 40 | 30 | 12 | 0 | 18 | 100 |
| 5 | 1546 | 17 | 37 | 28 | 18 | 0 | 100 |

Model Energy

The following relates to algorithmic approaches to model energy flows in the railway network. Different formulations can be inferred regarding to the topology of the real system one wants to model and to the simplifications one has to make to be able to optimize the model in reasonable time. The following shows several ways to formulate different parts of the energy section of the data model.

Energy Accountings

The way one is counting the energy consumed over a period of time obviously modifies the accuracy of the model. However it might be possible to show that the differences on counting energy influence only the absolute final value and not the relative gain of energy allowed by an optimization.

Some simplifications on how to count energy may thus be conceivable if the output of our model is a relative gain of energy compared to the initial solution. The need of refining the model is however essential if the output of the model considers absolute values like the maximum traction energy.

This formulation considers as the energy needed, thus the energy considered in optimization computation, the one which is effectively used to supply electrically the train. This model actually considers that the electric energy provided by electric stations is fully available without any loss anywhere on the network. This model is valid assuming that electric losses through materials and equipment can be considered as constant over a time period and then irrelevant for a relative optimization.

This formulation prefers considering the energy drawn from the electric provider needed to supply the train, possibly considering potential losses due to ohmic resistances in the third rail or in catenaries. This energy is logically higher than the energy eventually consumed by the train. This refinement is particularly important if maximum traction energy issues are considered.

Network Topologies

This formulation considers that all points of a network (most commonly a single metro line) are electrically linked. This means that a braking train would be able to provide energy to any given train accelerating at any point of the line.

This formulation considers that the network is divided into independent sections which are electrically isolated from each other. This means that a braking train would be able to provide its energy to trains accelerating only if they are in the same area or section.

This simplification considers that a single electric station is providing electric energy on all points of the network. This simplification, associated with the sink oriented energy counter, allows not considering the primary energy transportation which occurs between electric stations and trains accelerating. It permits focusing only on the secondary energy transportation, that is to say the exchange of energy from trains (braking) to electric stations or, depending on the model, directly from braking trains to accelerating trains.

This model considers that trains are electrically supplied by different electric sub-stations, depending on position on the network. For instance, one can consider that there is an electric sub-station at every metro station and that trains are drawing energy to the network from the electric sub-station/metro station they belong to at a particular time.

Energy Transportation

This transportation includes the transfer of electric energy between the electricity provider and the train, counting different devices such as cables or transformers which can occur as intermediaries.

This transportation includes the energy provided by regenerative brakes on trains to supply other trains, counting different devices such as cables or transformers which can occur as intermediaries.

Direct exchange is a formulation that considers regenerative energy is directly shared between trains only via wires.

Indirect exchange is a formulation that considers braking trains give back energy to the electricity provider which is able subsequently, to provide this energy to demanding trains. It is also possible to consider that regenerative energy is bought back by the electricity provider instead of being redistributed over the network Ohmic Resistance Loss One can consider the electric transportation through wires, catenaries and third rails as perfect, that is to say that electric energy provided by a device on the network would be usable fully and instantaneously by any other device of the network. It is obvious that for having a more accurate model, one has to consider ohmic resistance losses occurring in all cables. These energy losses can be considered on the primary energy transportation, the second energy transportation or both.

This formulation (geographic losses) allows the most accurate way to model ohmic losses. It is based on keeping track of trains over a grid which exactly represents the network topology. The losses are then simply computed, multiplying the distance between two electrically linked points by an attenuation rate. The main issue is that keeping track of trains geographically implies having an accurate model which includes distances and speeds. This formulation seems to be at first glance too much refined to have a simple and fast optimization program.

This formulation (interstation losses) is a relaxation of the geographical topology. It only keeps track of the interstation (the area between two metro stations) where every metro is. So the losses are computed by checking the distance between two interstations and applying an attenuation rate as shown in Table B. For instance, if two metros are in the same station, the distance is 0, and so on.

TABLE B

Attenuation rate in function of the distance between two interstations

| | Interstation Distance | | | | | |
|---|---|---|---|---|---|---|
| | 0 | 1 | 2 | 3 | 4 | 5+ |
| Attenuation rate | 1 | 0.9 | 0.7 | 0.4 | 0.1 | 0 |

Depending on the network and physical constraints given by experts, it is possible to set different functions of attenuation.

The attenuation decreases linearly along the distance between two points. The gradient would be chosen accordingly with experts.

The attenuation is low over short distances and decreases strongly when distances decrease.

Equipment Losses

It is considered here that the different energy transportation devices (cables, catenaries, third rails . . . ) have the same ohmic resistance and, thus, the energy loss along distance is simply a function of an attenuation rate (e.g., homogeneous equipment).

Catenaries, third rails, etc. have different ohmic resistances and each section/area is associated with equipment and, thus, a particular attenuation function. If during an energy transfer, different equipment is used, then the losses are different along the different sections (e.g., heterogeneous equipment).

A selection can be made between choosing to count, or not, devices which are intermediaries between two electric points, such as transformers, providers or trains. Every device can have an energetic efficiency that one has to take into account in the computation of the energy consumption (e.g., transfer equipment counting).

Data Shape

Beyond the several possibilities given by all different sorts of data one could get, one model with a particular shape for data has been chosen for a first implementation. It follows the formulation of past work adding some refinements in terms of computing energy. The shape of the important data needed as soon as possible is explicated below.

The precision for the discretized data (e.g., discrete data) is chosen at 5 seconds. It is then possible to optimize finely without altering quality of service. Moreover most state-of-art software works with a granularity of 5 seconds.

Data Table

The below Table C illustrates data tables regarding an exemplary trip 1 and trip 2.

TABLE C

| | Shape for data formatting | | | | | | |
|---|---|---|---|---|---|---|---|
| | T1 -> T2 | | | | T2 -> T1 | | |
| | Trip | | | | Trip | | |
| | 1 | 3 | 5 | | 2 | 4 | 6 |
| Departure Time | 0 | 240 | 500 | Departure Time | 50 | 295 | 550 |
| Dead Run Time | 120 | 120 | 120 | | 135 | 135 | 135 |
| | Speed Profile | | | | Speed Profile | | |
| T1 -> S1 | norm | norm | norm | T2 -> S4 | normal | normal | eco |
| S1 -> S2 | eco | eco | eco | S4 -> S3 | normal | eco | eco |
| S2 -> S3 | eco | normal | eco | S3 -> S2 | normal | normal | eco |
| S3 -> S4 | eco | eco | fast | S2 -> S1 | eco | fast | fast |
| S4 -> T2 | fast | fast | fast | S1 -> T1 | fast | fast | normal |
| | Dwell Time | | | | Dwell Time | | |
| S1 | 30 | 25 | 35 | S4 | 30 | 25 | 30 |
| S2 | 25 | 25 | 25 | S3 | 30 | 25 | 25 |
| S3 | 30 | 35 | 30 | S2 | 30 | 40 | 25 |
| S4 | 30 | 30 | 25 | S1 | 30 | 30 | 25 |
| T2 | 40 | 40 | 40 | T1 | 40 | 40 | 40 |

Arrivals and departure times of trip 1 can be drawn from the data table above and the energy patterns of each interstation/speed profile.

| | Trip 1 | | | | | | | | | |
|---|---|---|---|---|---|---|---|---|---|---|
| | Journey | | | | | | | | | |
| | T1D | S1A | S1D | S2A | S2D | S3A | S3D | S4A | S4D | T2A | T2D |
| Time | 0 | 120 | 150 | 300 | 325 | 475 | 505 | 655 | 685 | 785 | 825 |

A = Arrival
D = Departure

An interstation, in accordance with a speed profile, will have a specific energy pattern (see Table D). This pattern represents the energy consumed (or generated) by a train within timeslots of 5 seconds. The duration of this pattern (in terms of timeslots) will be used to set the timetable of the trip.

TABLE D

Example of an energy pattern
S1 -> S2 normal

| 5 sec Timeslot | traction (kW · h) | Comments |
|---|---|---|
| — | 0.00 | dwell |
| 1 | 1.39 | traction |
| 2 | 5.56 | |
| 3 | 8.33 | |
| 4 | 4.17 | |
| 5 | 0.69 | coasting |
| 6 | 0.69 | |
| 7 | 0.69 | |
| 8 | 0.69 | |
| 9 | 0.69 | |
| 10 | −4.17 | braking |
| 11 | −2.08 | |
| 12 | −0.69 | |
| — | 0.00 | dwell |

This (dead run times) represents the time needed for a train to operate in terminal. This includes the change of direction and of driver. These figures are important to check that not too many trains are "jamming" in terminals during optimization.

An attenuation matrix can be employed. Even if a metro line consists of several electric sub-stations and sections which supply energy to trains accordingly to their geographical position, consider that sections are interconnected so that regenerative energy from braking can be dispatched all along the line.

This hypothesis implies taking into account the Joule effect in the third rail. The lineic resistance of the third rail is equal to 7 μΩ/m.

The driving tension for metros is equal to 750V.

The regenerative energy is equal to around 30-40% of the traction energy. The power peak of traction for a single train is equal to 3000 kW and to 2000 kW for the braking phase.

Consider after some computation (see below Annex 1) that the attenuation is equal to 1.65%/km. It means that if a braking train is able to produce 3MJ, it will be however able to supply a train at 5 km from it with only 2.75MJ.

Every given time, it will be possible to know at which interstation (the line between two stations) a train is, knowing the journey pattern and the time pattern of every train. Then, when a train will brake to supply candidate trains on the line, it will be necessary to compute the attenuation of the energy along the third rail.

To compute the attenuation between two interstations, multiply the attenuation rate by the probable distance between two trains.

For instance, if two trains are in the same interstation, one cannot know exactly where they are and the distance which separates them.

That's why a probabilistic value can be used to compute the attenuation which is done as follows: 1) If two trains are in the same interstation, their probable distance is ⅓ of the length of the interstation; and 2) If two trains are in two different interstations, their distance is equal to half of the length of the two interstations they belong to plus the length of the interstations which separate them.

Figure 11:
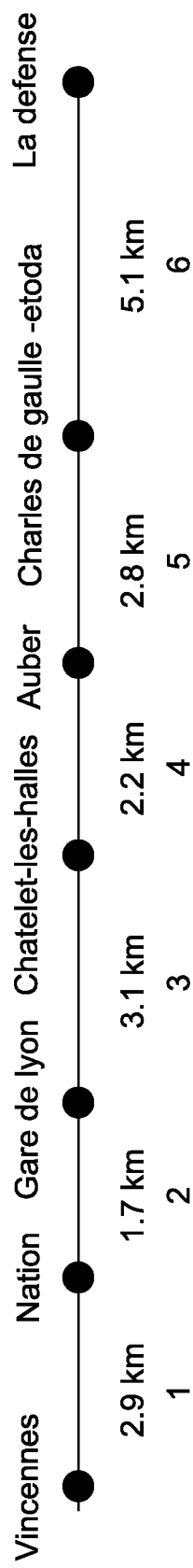
FIG. 11 illustrates an example of interstation lengths for a vehicle.

The example below (FIG. 11 and Table E) shows how an attenuation matrix will look. FIG. 11 illustrates an example of interstation lengths using the RER A path in Paris. Annex 3 explains how the figures are computed. In the example, if a train is generating energy in interstation 2 (between Nation and Gare de Lyon) to supply a candidate in interstation 5 (between Auber and Charles de Gaulle—Etoile) then the energy supplied will be attenuated by 12.5%.

TABLE E

Attenuation matrix related to FIG. 11

|   | 1 | 2 | 3 | 4 | 5 | 6 |
|---|---|---|---|---|---|---|
| 1 | 1.65 | 3.8 | 7.76 | 12.1 | 16.3 | 22.7 |
| 2 | 3.8 | 0.99 | 3.96 | 3.22 | 12.5 | 18.9 |
| 3 | 7.76 | 3.96 | 1.65 | 4.37 | 14.9 | 14.9 |
| 4 | 12.1 | 3.22 | 4.37 | 1.16 | 4.13 | 10.6 |
| 5 | 16.3 | 12.5 | 8.5 | 4.13 | 1.49 | 6.44 |
| 6 | 22.7 | 18.9 | 14.9 | 10.6 | 6.44 | 2.81 |

In most cases, power peaks are computed independently for each substation. However, total energy consumption is computed globally. The trickiest problem when computing sum of energy consumptions is to compute the attenuation of regenerative energy. Indeed, if you consider in a timeslot one regenerative train and two candidate trains for its energy, you can't solely subtract the regenerative of the sum, you have to compute the attenuation for giving energy to every candidate and not counting it in the sum of energy consumptions.

Hypothesis 1: Regenerative energy of a braking train is given in priority to the closest candidate and so on until the braking train doesn't have any more energy remaining or no more trains are a candidate.

Hypothesis 2: if several trains generate energy, the one which generates the most supplies in priority.

Hypothesis 3: if no more trains are candidates while some regenerative energy remains, this energy is considered lost and the sum of energy consumptions is equal to 0.

Please see the algorithm in the section below referenced Annex 2 for more details.

Headways are computed between adjacent trains on the line all along their respective trips. It is possible to easily compute headways at every station subtracting arrivals and departures of trains (see Table C) and checking headways are included in authorized intervals.

These authorized intervals are expressed in terms of percentage. For instance, possible headways for an optimization would be in this interval: 0.9×Initial Headway<Authorized Headway<1.1×Initial Headway.

Commercial speed is the time a train takes to cover its whole trip. As well as headways, commercial speed must stay in an authorized interval after optimization. However, different tolerances may be considered regarding the daytime: tolerances will be looser during off-peak hours, for instance.

Data Outputs

The modifications of the timetable are the heart of the energy optimization. They consist in changing, under some constraints, the departure times of trains at every station and the speed profiles of trains at every interstation. The data table will compile all modifications of every trip at every station. The modifications will be directly used to change the energy timetable. The modifications are described by the delay in timeslots (so here in seconds) between the original driving pattern and the optimized one. If a departure is earlier than the original one, the delay will be negative and positive if it's later. Note that dead run times are a priori not modifiable.

Here is an example (Table F) of timetable modifications:

TABLE F

Timetable modifications example
T1 -> T2

|  | Trip | | |
|---|---|---|---|
|  | 1 | 3 | 5 |
| Departure Time | — | 5 | −10 |
| Dead Run Time | — | — | — |
| Speed Profile | | | |
| T1 -> S1 | — | fast | — |
| S1 -> S2 | — | normal | — |
| S2 -> S3 | — | — | — |
| S3 -> S4 | normal | — | normal |
| S4 -> T2 | — | — | — |
| Dwell Time | | | |
| S1 | 5 | — | 10 |
| S2 | −5 | — | 5 |
| S3 | 10 | −5 | 5 |
| S4 | — | −10 | — |
| T2 | — | — | — |

In trip 1, the speed profile for interstation S3 ->S4 changes from economic to normal when the dwell time at station S3 for trip 3 is shortened by 5 seconds.

Basically, the energy timetable is a function of the data table (which gives the departure times, the dwell times and the speed profiles), the energy patterns (which fill the energy consumption from the departure timeslot until the end of the pattern) and the timetable modifications (which modifies the pattern).

It also compiles the section where every train is at every timeslot to compute the energy consumption.

Annex 1

Consider a single train that can be supplied for traction up to 3MW and power peak in regenerative braking is equal to ⅔ of this amount, thus 2MW. Consider that a nominal voltage of the line is 750V. Consider a lineic resistance of the third rail is 7 μΩ/m. Consider braking lasts 15 seconds and generates electricity from 2MW to 0 following a linear curve.

$$W_{braking} = \int_0^{15} P_{braking} \cdot dt$$

$$W_{braking} = \int_0^{15} \left(2.10^6 - \frac{2.10^6}{15}t\right) \cdot dt$$

$$W_{braking} = 15 \text{ MJ}$$

Knowing that $$W_{heat} = \int P_{heat} \cdot dt$$

Where $W_{heat}$ is the energy dissipated due to Joule's law and $P_{heat}$ the power dissipated, That $$P_{heat} = R_{lineic} \cdot D \cdot I^2$$

Where $R_{lineic}$ is equal to the lineic resistance of the third rail, D the distance between the regenerative train and the candidate and I the intensity With $$U = R \cdot I$$

Thanks to Ohm law, U being the voltage,
We have $$P_{heat} = D \cdot \frac{U^2}{R_{lineic}}$$

So $$W_{heat} = \frac{D \cdot R_{lineic}}{U^2} \int_0^{15} \left(2.10^6 - \frac{2.10^6}{15}t\right)^2 \cdot dt$$

$$W_{heating} = 24.9 \text{ kJ}$$

With D=1 km.
So the attenuation for 1 km of distance is equal to Annex 2

$$\text{Attenuation} = \frac{W_{heating}}{W_{braking}} = 1.65\%/\text{km}$$

For a given timeslot:

```
SETS:
Trains (relevant at this given timeslot)
Givers = {i, ∀i ∈ Trains / E_i < 0} ordered by E descend
              Candidates = {i, ∀i ∈ Trains /E_i > 0}
PARAMETERS:
P_i = geographical position of i ∈ Trains
E_ni = energy consumed (or generated)by i ∈ Trains
M_i,j = rate of attenuation between i ∈ Trains and j ∈ Trains
VARIABLES:
X = energy consumption in the timeslot
E_i = energy consumed effectively by i ∈ Trains
D_i = ohmic resistance distance of i ∈ Candidates to a given train
for all (i in Trains)
        E(i) = En(i);
for all (i in Givers)
        if(Candidates = { })
                break;
        for all (j in Candidates)
                D(j) = M(P(i),P(j));
        Set CandidatesRelative = Candidates ordered by D ascend;
        while(CandidatesRelative != { } || E(i) != 0)
                if(E(j) > E(i)*D(j))
                        E(j) = E(j) - E(i)*D(j);
                        E(i) = 0;
                else
                        E(i) = E(i) - E(j)*D(j);
                        E(j) = 0;
                        remove j from CandidatesRelative;
                        remove j from Candidates;
X = sum(i in Trains)(E(i));
if(X < 0)
        X = 0;
return X;
```

The following is a description related to energy saving.

The following innovation can reduce energy consumption in metros without adding specific hardware, by taking into account quality of service (QoS), and using existing time tables. The subject innovation can reduce energy consumption by avoiding loss of regenerative energy. This may not be applicable when a train does not give back energy or when regenerative energy is saved (e.g., batteries, super capacitors, reversible electrical substation, flywheels, in train, or trackside, etc.).

The subject innovation can be a free optimization. There may be no specific hardware required (e.g., batteries, super capacitors, reversible electrical substation, flywheels, etc.). There can be a reduced cost for optimizing a timetable and there can be an objective of 5% savings.

Figure 5:
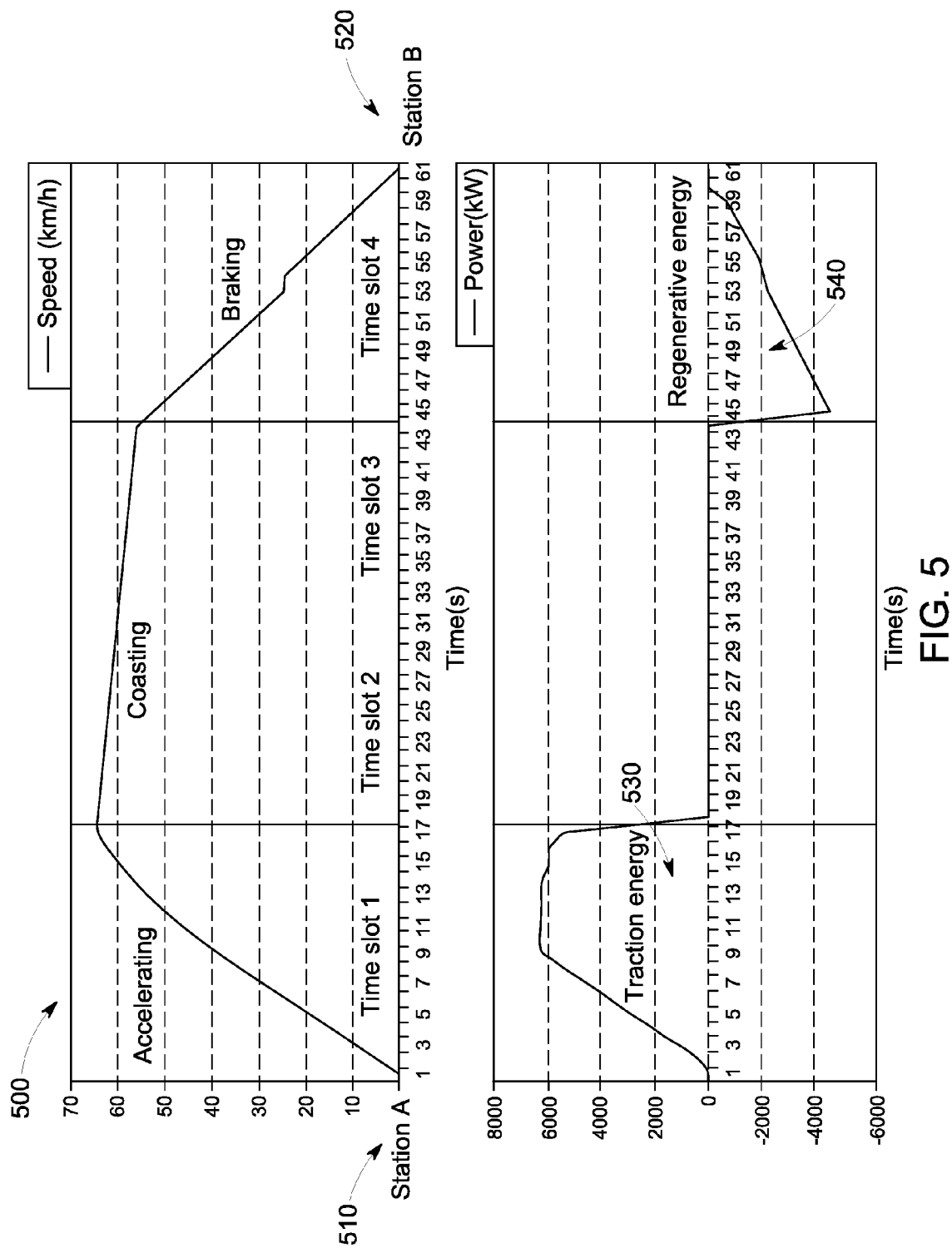
FIG. 5 is an illustration of a graph related to energy consumption of a vehicle.

FIG. 5 illustrates energy consumption of a vehicle (e.g., a metro, a train, among others) on an interstation run in a graph 500. The graph includes a first terminal 510 and a second terminal 520 in which the vehicle can travel therebetween. The graph illustrates a traction energy 530 corresponding to the acceleration of the vehicle from the first terminal. Additionally, the graph illustrates a regenerative energy corresponding to the braking of the vehicle at the second terminal.

Figure 6:
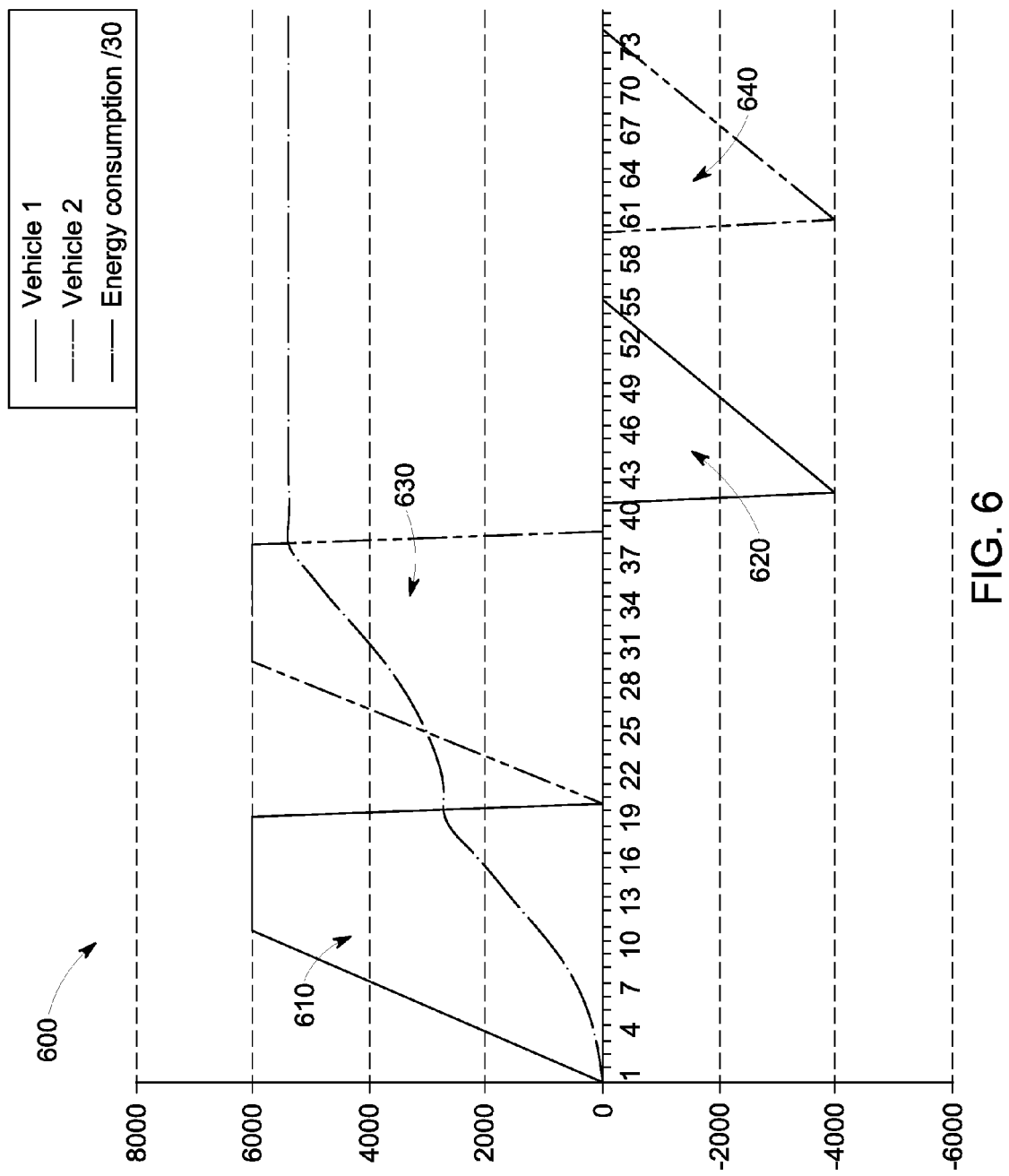
FIG. 6 is an illustration of a graph related to energy consumption of two unsynchronized vehicles.

FIG. 6 illustrates energy consumption of two vehicles (e.g., metros, trains, among others) in a graph 600. The graph illustrates two (2) unsynchronized vehicles (e.g., trains, metros, among others) in which the energy consumption is approximately 162000 kJ (e.g., 45 kWh). The first vehicle (also referred to as train, metro, among others) includes a traction energy 610 upon acceleration and a regenerative energy 620 upon braking. The second vehicle includes a traction energy 630 associated with accelerating and a regenerative energy 640 associated with braking. The energy consumption is at a high level due to each vehicle adding to the energy consumption.

Figure 7:
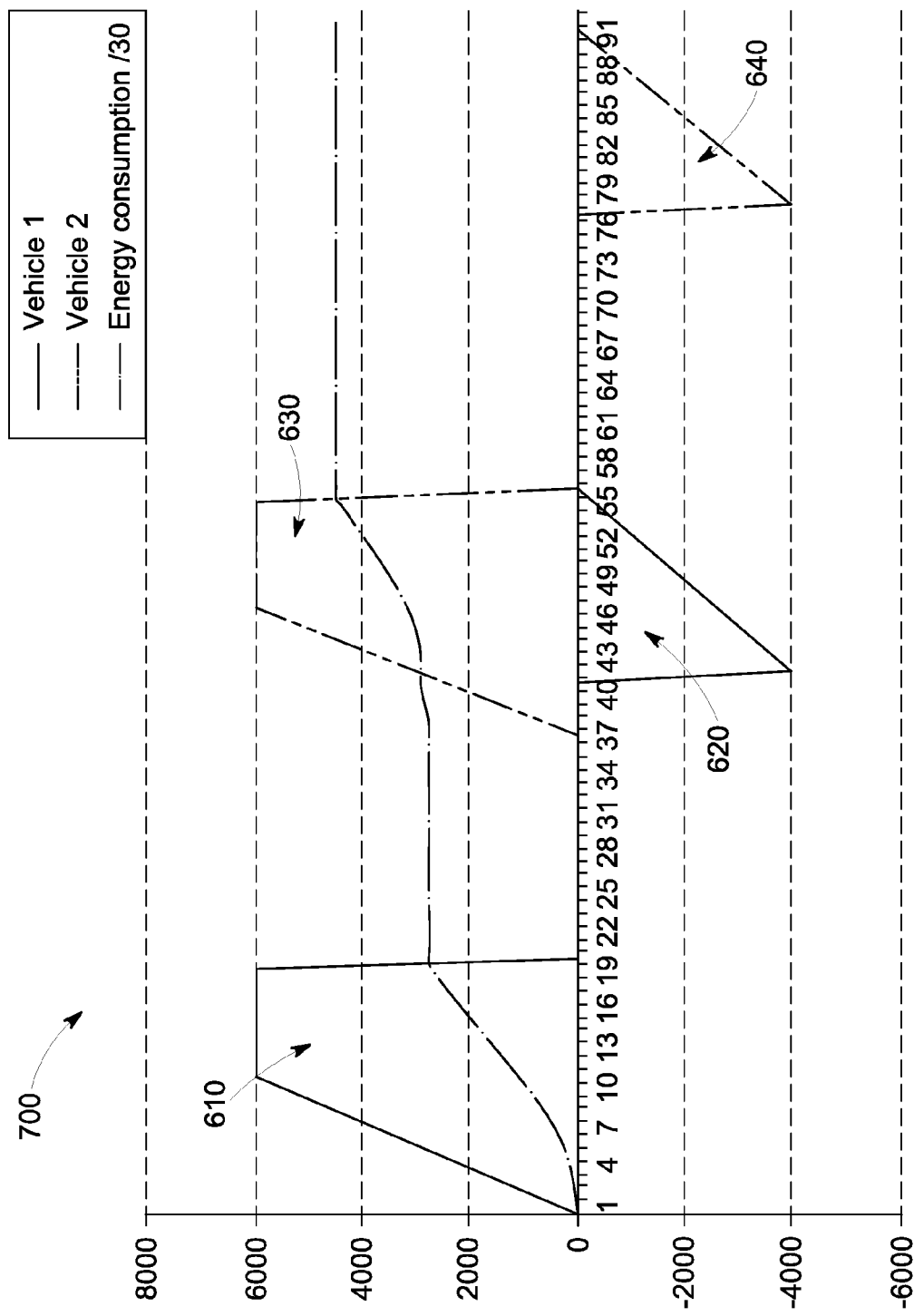
FIG. 7 is an illustration of a graph related to energy consumption of two synchronized vehicles.

FIG. 7 illustrates energy consumption of a vehicle (e.g., a metro, a train, among others) in a graph 700. The graph illustrates two (2) synchronized vehicles in which the energy consumption is 133300 kJ (e.g., 37 kWh) (an amount lower than the amount in FIG. 6 for unsynchronized vehicles). The traction energy 630 of the second vehicle can overlap and correspond to the regenerative energy 620 of the first vehicle, wherein the second vehicle is accelerating and the first vehicle is braking. There can be a suitable number of vehicles that allow overlap of an acceleration and braking, and two vehicles is used as an example.

For instance, there can be more than 10,000 interstation runs in a single operational day. Moreover, it is a combinatory problem on how to synchronize and how much can be saved.

There are quality of service (QoS) constraints. Passenger QoS in urban transit systems can be determined by 2 factors: 1) average wait time for passengers in a platform at a terminal (e.g., headway adherence); and 2) travel time (e.g., commercial speed).

Energy optimization of a timetable shall minimize the deviation of planned QoS (e.g., keeping the deviation under a threshold defined by the metro operator). The operator may accept more QoS deviations in off peak hours. Moreover, there are more energy losses in off peak hours (e.g., fewer train candidates).

There are different possible modifications to implement. For instance, terminal departure times, dwell times, and speed profiles can be modified.

Terminal departure times can be modified and may impact headways (e.g., not commercial speed). An optimized timetable can be loaded in most "classical" Automatic Train Stop (ATS) scenarios (e.g., no tempo ATS).

Dwell times can be modified and can be changed by a few seconds each time. The dwell times can be shortened or lengthened and may impact headways and/or commercial speed.

Speed profiles can be modified. For instance, ATC and/or Automatic Train Operation (ATC/ATO) generally allow different speed profiles. For instance, different speed profiles can include normal speed, accelerated speed, and economy (eco) mode. The modification of speed profiles may impact headways and/or commercial speed.

Additional constrains can be headways, rolling stock availability, track availability, and QoS. Headways allowed by ATC/ATP can be hard constraints. ATP may never authorize a train to go under minimum headway. Rolling stock availability can also be a hard constraint. There shall be an available train for a train departure (typically a train cannot depart before arriving). Track availability can be a hard constraint. A terminal cannot contain more trains than platforms. QoS can be a soft (e.g., flexible) restraint.

There can be energy attenuation due to Joule's effect. Part of the regeneration energy can be lost in a $3^{rd}$ rail. Only a 'neighbor' train can absorb energy. The subject innovation provides an accurate model for optimization and a model for the electric topology of the network.

There can be local search methods that use an initial timetable. There may be no need for a global optimum. Minimizing modifications include two methods that have been tested 1) Tabu search (meta heuristics) and 2) genetic algorithms.

Tabu search includes the following: start from one initial timetable, make a modification that minimizes the objective, avoid making this modification for some iterations, and go back to making a modification that minimizes the objective until a termination criterion is met.

Genetic algorithms (GAs) include the following: instantiate a population of timetables slightly different from the initial one, classify the timetables, mate them (e.g., crossover), mutate them, and go back to instantiating a population of timetables until a termination criterion is met.

The Tabu method can be tested on terminal departure time. There can be a modification of $\{-30,0,+30\}$ of any departure time in an off line timetable with a timeslot of 15 s. The results show a 3% savings (using as example data of a Korean Metro line). The test can be limited based upon no model of energy attenuation and/or no verification of RSM/track availability.

The GA method can be tested on dwell time modification. The dwell times can be changed by $\{-3\ s,\ 0\ s,\ 3\ s,\ 6\ s,\ 9\ s\}$ in an off line timetable with a time horizon of 1 hour (from 10 am to 11 am). With the use of Gas, this provides a computation time of 45 minutes.

The sample metro results provide the following: Initial consumption: 14360 kWh; After optimization: 13560 kWh; and Savings: 800 kWh/5.6%. The test can be limited based upon the data being test data.

In another example, there can be an offline/online optimization. The off-line optimization can be with GA in which robustness is provided with many constraints and variables. In an online optimization, the Tabu method can be used for rapidity, adaptability, need to take into account others online classical regulation objectives (e.g., headway, regulation, passenger platform de-synchro, correspondence, safe haven, etc.). The online optimization can include criteria to trigger the optimization. Moreover, the response time can be taken into account.

The following relates to problem description and complexity. Without regarding different benchmarks or models, one can classify the different problems occurring in the field of energy optimization in metro lines. Indeed many combinatorial problems, like the knapsack or the bin packing ones, accept different variants where variables, parameters or constraints differ. A hierarchy can be formulated between different variants by showing that some problems are sub problems or particular cases of others. One can try to do the same here, to order the different models and problems in the field. There are three points on how energy optimization problems differ from each other:

The objective function. The physical quantity can take several forms. When minimizing power peaks (PP) i.e. $\max_{t \in T} y_t$, this model minimizes the global energy consumption of the line (G), i.e. $\Sigma_{t \in T} y_t$ $$d_{i,j} = D_{i,s} + \eta \cdot \delta$$

The variables. Different quantities can be modified to optimize any given objective function. One can consider three different variables that can be modified in a timetable:

The departure times (D), or the timeslot when a particular trip is starting from its first station.

The dwell times (d), or the time spent for a train in every station.

The speed profiles (s). It is common to have several profiles for a train to cross two stations; typically a nominal one, a full speed and an economic one. Changing speed profiles allows the timetable as well as the energy curve to be modified.

One can combine different variables to optimize the objective function (e.g., change speed profiles and dwell times by using reserve times of each trip).

The energy spreading. One can add some subtleties to the model to stick more to real situations. In particular, the way the energy is spread throughout the third rail is primary:

The simplest model allows regenerative energy to be totally spread throughout the entire metro line (wJ for "without Joule's effect").

In the other way, the attenuation of regenerative energy, when it passes in the third rail, can be formalized (J) like in our model by, for instance, having an attenuation matrix compiling losses between different points of interest of the line. Note that the model wJ can be done by having a trivial attenuation matrix.

Also, electric sub stations can be ($n_C$), or not, coupled (C). It means that sometimes, it may not be possible to send regenerative energy from a point of the line to another due to the independence of two sub networks in the electric system. This independence can also be done via an attenuation matrix by attenuating completely points which are not belonging to the same electric sub station.

Using this classification, one can classify our model in (G, d, C-J).

The following relates to computational complexity. It is well-known that optimizing a timetable can be a highly combinatorial problem. Here, it is shown that the dwell times energy minimization problem is NP-hard, by showing that SAT can be polynomially reduced to a particular class of instances of the dwell time energy saving decision problem. Let $X_1, \ldots, X_n$, be variables and $\phi$ a Boolean formula in conjunctive normal form:

$$\phi \Leftrightarrow \bigwedge_{i=1}^{m} \bigvee_j l_{i,j}$$

where every $l_{i,j}$ is a literal of the form $X_k$ or $\neg X_k$ for $1 \le k \le n$. For every $1 \le k \le n$ and $1 \le i \le m$, one can pose $$u_{k,i} = \begin{cases} -1 & \text{if } X_k \in \{l_{i,j}\}_j, \\ 1 & \text{if } \neg X_k \in \{l_{i,j}\}_j \text{ and} \\ 2 & \text{if otherwise} \end{cases}$$

Let T be the sample of a timetable and S the set of stations. Let I be the set of trains consisting of 1 train to and n other trains. All trains stop at stations different from each other during the time horizon. Thus there are m·(n+1) stations in the metro line. The time can be discredited different moments that can be:
- a dwell time, $d_{k,i}$
- an acceleration $a_{k,i}$
- a braking $b_{k,i}$
- a coasting time $c_{k,i}$.

Let a journey trip for a single train be a periodic succession of dwell times, accelerations, coasting times and braking.

For $t_0$ and $\forall i \in S$, the interstation time is equal to 8 and the journey pattern is a periodic succession of:
- a braking phase $b_{0,i}=1$
- a dwell time $d_{0,i}=5$
- an acceleration phase $a_{0,i}=1$
- a coasting phase $c_{0,i}=1$.

By construction, it is suggested that the three first timeslots are the end of the coasting phase of a previous interstation. This means that to has its braking phase for every timeslot t such as $t=8 \cdot i-4$ with $1 \le i \le m$.

The other n trains have a journey length equal to 8m−1. So $\forall k \in \{I \dagger t_o\}$ there is a succession of m period of:

$b_{k,i}^k=1$ and $b_{k,0}=0$ $d_{k,i}^k=3+u_{k,i}^k$ and $d_{k,1}=3+u_{k,i}^k+\delta_k$ with $\delta_k \in \{-1,1\}$ $a_{k,i}^k=1$ $c_{k,i}^k=3-u_{k,i}^k$.

The aim of the optimization is to synchronize accelerations of the n trains with the braking of $t_o$. The timetable is synchronized if and only if trains which accelerate can be optimally synchronized with braking of to.

Lemma 1. For every timetable T' derived from T with $\delta'$, there exist $k \ge 1$ and a time t such that $T'_{k,t}=-T'_{0,t}=+$ and a station i such that $t=8 \cdot i-4$, and there exists a j such that $l_{i,j}=X_{k'}$ or $l_{i,j}=\neg X_{k'}$ and $\delta'_{k',1}=-1$ if $l_{i,j}=\neg X_{k'}$ and $\delta'_{k',1}=1$ if $l_{i,j}=X_{k'}$.

Proof For every $1 \le i \le m$, let $t=8 \cdot i-5$. Then $T_{0,t}=-$. For every $k' \ge 1$, if there exists a j such that $l_{i,j}=X_{k'}$, then $u_{k',i}=-1$ and $T_{k',t-1}=+$, therefore if $\delta'_{k',1}=1$ then $T'_{k',t}=+$. Similarly, if here exists a j such that $l_{i,j}=\neg X_{k'}$, then $u_{k',i}=1$ and $T_{k',t+1}=+$, therefore if $\delta'_{k',1}=-1$ then $T'_{k',t}=+$.

Conversely, if there exist k, k' and a time t such that $T'_{k,t}=+$ and $T'_{k',t}=+$. Note that there is $T_{0,t}=+$ only if $t=8\cdot i+2$, there is, for $k \ge 1$, $T_{k,t}=+$ only if $t=8\cdot i-5+u_{k,i}$, with $-1 < u_{k,i} < 2$, and there is, for $k \ge 1$, $T_{k,t}=-$ only if $t=8\cdot i-1$. Therefore, k=0 and k'≥1 and there exists an i such that $t=8\cdot i-5$. Since $T'_{k',t}=+$, there is either $\delta'_{k',1}=-1$ or $\delta'_{k',1}=-1$. If $\delta'_{k',1}=-1$, then $u_{k',i}=1$ and there exists j such that $l_{i,j}=\neg X_{k'}$. Similarly, if $\delta'_{k',1}=1$, then $u_{k',i}=-1$ and there exists j such that $l_{i,j}=X_{k'}$.

Theorem 1. The network can save m energy units if and only if $\phi$ is satisfiable.

Proof If $\phi$ is satisfiable, there exists a valuation v such that $v(\phi) \Leftrightarrow 1$. Consider the timetable T' derived from T with for every $1 \le k \le n$, $\delta'_{k',1}=1$ if $v(X_k)=1$ and $\delta'_{k',1}=-1$ if $v(X_k)=0$. For every clause $1 \le i \le m$, since $v(\phi) \Leftrightarrow 1$, there exists a j such that $v(l_{i,j})=1$: that is to say, either $\delta'_{k',1}=-1$ if $l_{i,j}=\neg X_k$ or $\delta'_{k',1}=1$ if $l_{i,j}=X_k$. Therefore, according to lemma 1, for $t=8 \cdot i-5$, there is $T'_{0,t}=-$ and $T'_{k,t}=+$. So it is possible to save one energy unit at time $t=8 \cdot i-5$ for every $1 \le i \le m$.

Conversely, if there is a timetable T' derived from T with $\delta'$ which saves m energy units, therefore according to lemma 1, these saves occur at times $t=8 \cdot i-5$ for $1 \le i \le m$. Consider the valuation v such that for every $1 \le k \le n$, $v(X_k)=1$ if $\delta'_{k,1}=1$, $v(X_k)=0$ otherwise. For every clause $1 \le i \le m$, there is a save at time $t=8 \cdot i-5$. Therefore, according to lemma 1, there exist k and j such that either $l_{i,j}=X_k$ or $l_{i,j}=\neg X_k$ and either $\delta'_{k',1}=-1$ if $l_{i,j}=\neg X_k$ or $\delta'_{k',1}=1$ if $l_{i,j}=X_k$. That is to say $v(l_{i,j})=1$.

EXAMPLE 1

Let $\phi \Leftrightarrow (x \vee y \wedge \neg z) \vee (x \vee \neg y \vee z) \wedge (\neg x \vee y)$, the constructed timetable T is as follows, with t for travel at coasting speed, for breaking, + for

| $t_0$ | t | t | t | − | d | d | d | d | d | + | t | − | d | d | d | d | d | + | t | − | d | d | d | d | d | + | t |
| x | d | d | + | t | t | t | t | − | d | d | + | t | t | t | t | − | d | d | d | d | + | t | t |
| y | d | d | + | t | t | t | t | − | d | d | d | d | + | t | t | − | d | d | + | t | t | t | t |
| z | d | d | d | d | + | t | t | − | d | d | + | t | t | t | t | − | d | d | d | d | + | t | accelerating, and d for dwell time.

The following relates to a fitness function. The fitness function of the genetic algorithm is copied on the objective function of the model. Different methods are presented below to resolve it, as the computation of it is not trivial. Even if it can be modeled as a generalized max flow problem in a lossy network, whose some resolution algorithms run in polynomial time (in around $O(n^4)$ though), it can also be resolved by a pure LP problem, and by a heuristic whose deviation to the real values is really small.

The following relates to generatlized max flow problems in a lossy network. The notion of max flow has been introduced by Ford-Fulkerson in 1962 and has been a major research field in the 80's to find polynomial time algorithms. The max flow problem is the problem of maximizing a flow in a flow network.

A flow network is a finite directed graph G(V, E) consisting of edges $(u, v) \in E$ with a capacity $c(u, v)$ and a flow $f(u, v) \le c(u, v)$ and at least two vertices$\in V$, the source s which can produce flow and the sink t which can absorb flow.

In the generalized maximum flow problem, edges are given in addition with a positive gain function $\gamma(u, v)$ and an excess function $e_f$ such as:

$$e_f(i) = \sum_{v \in V | (v,u) \in E} \gamma(v, u) f(v, u) + \sum_{v \in V | (v,u) \in E} f(u, v)$$

which means that if a flow $f(u, v)$ is entering at vertex v then $\gamma(u, v) f(u, v)$ is going out from v.

Identically to regular maximum flow problems, a flow conservation constraint exists here and ensures that:

$e_f(i)=0, \forall i \in V \setminus \{s,t\}$.

Then the generalized max flow problem is to find a generalized flow f maximizing the excess function at sink $e_f(t)$.

The generalized max flow model allows to formulate the computation of the objective function as a particular case of it.

Let's consider an oriented graph G(V E) with vertices as follows:
- a source s
- vertices corresponding to trains that produce energy (I⁻)
- vertices corresponding to trains that consume energy (I⁺)
- a sink t.

Edges consist in the virtual links between trains and energy. Then, there are three types of edges:
- the edges starting from the source which represents the virtual energy which is given to trains that produce energy. The source virtually gives in the graph energy to trains∈I⁻ with an efficiency of 1.

$(s,i) \in E \Leftrightarrow i \in I^-$ $c(s,i) = E_i^-, \gamma(s,i) = 1$

- the edges virtually linking trains that produce energy to those which consume it. Indeed, producers are potentially able to distribute their energy to any consumer, even several consumers. The difference in the distribution is the efficiency along the edge representing the Joule's effect losses directly proportional to the distance between trains.

$(i,j) \in E \Leftrightarrow i \in I^-, j \in I^+, F_i \neq j \in I^+$ $c(i,j) = E_i^-, \gamma(i,j) = A_{i,j}$

- the edges going from consumers to the sink represent the energy that has effectively been saved during the transfer of regenerative energy. The capacity of these edges ensures that a consumer cannot get more energy than it can absorb.

$(i,t) \in E \Leftrightarrow i \in I^+$ $c(i,j) = E_i^+, \gamma(i,j) = 1$

For example, a zero flow can correspond to an absence of regenerative energy transfer. By augmenting flow along paths between source and sink, more and more energy is saved until saturation of the graph. As the energy consumption of a timeslot is equal to the energy consumed by accelerating trains minus the amount of regenerative energy they absorb, the corresponding objective function in the generalized max flow representation is:

$$obj = \sum_i^{I^+} (c(i,t) - f(i,t))$$

with the capacities o edges representing the energy consumption of accelerating trains and the flow the regenerative energy they absorbed.

As the gains along edges are all less than equal to 1 ($A_{i,j}$ are attenuation factors, so all are ≤1), the formulation is a lossy network. A lossy network is a generalized network where a flow can decrease as it goes through edges. Onaga proved in two theorems for the generalized max flow problem in a lossy network as follows.

Theorem 2. A given flow is optimal if and only if the residual network does not contain any flow-generating cycle from which the sink t is reachable.

Note that a flow can be optimal even if this is not the maximum flow. A given flow is optimal if the way it is spread in the network minimizes losses along the edges.

Theorem 3. If a flow is optimal then augmenting it on the highest-gain path in the residual network does not create any flow-generating cycle.

Note that the highest-gain path is the path P from s to t such $\Pi_{(i,j) \in P} \gamma(i,j)$ is maximized.

The residual network represents the possibility on every edge of pushing back flows. If there is the set of reverse edges $\overleftarrow{E} = \{(j,i)/(i,j) \in V\}$ and for every edge the gain function $\gamma(j,i) = 1/\gamma(i,j)$. If a residual graph $G_r(V, E_r)$ is associated with $E_r = \{(i,j) \in E | f(i,j) < c(i,j)\} \cup \{(j,i) \in \overleftarrow{E} | c(i,j) > 0\}$, residual capacity functions are as follows:

$$c_r(i,j) = \begin{cases} c(i,j) - f(i,j)(i,j) \in E, \\ \gamma(j,i)f(j,i)(i,j) \in \overleftarrow{E}. \end{cases} \quad [14]$$

Figure 12:
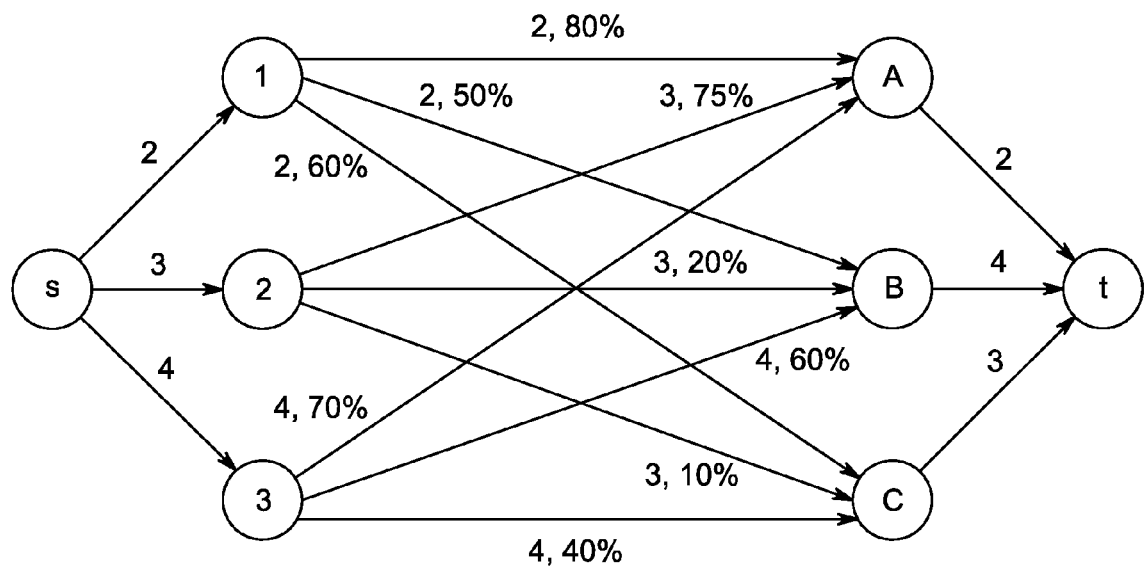
FIG. 12 illustrates an example in accordance with the subject innovation.

Finding the optimal max flow in a generalized network is then equivalent to saturating the residual generalized network along a highest-gain path. Consider the following example (See FIG. 12) consisting of 3 trains 1, 2 and 3 producing respectively 2, 3 and 4 units of energy and 3 trains A, B and C consuming respectively 2, 4 and 3 units of energy: The capacity and the gain for those are different from 1 along edges.

Starting with a flow of 0, it is optimal and the residual network is equal to the generalized network. Augmenting flow along highest-gain paths will allow to get optimal max flow when there is no more augmenting path. State of art algorithms now run in $O(E^2(E+V \log(V \log B)) \log B)$ with B the largest integer in the representations of capacities and gains.

The heuristic consists in the idea of transferring the energy of each producer to respective closest consumers in the line. By doing that, the transfer of energy is optimal if producers are all independent from each other. Indeed, the choice of which producer will transfer its energy first is randomized so a global optimum cannot be reached.

The algorithm works as follows:

```
1:   while list_of_producers ≠ 0 do
2:       Choose one producer.
3:       while producer energy > 0 do
4:           if list_of_consumers = 0 then
5:               finish
6:           Choose closest consumer.
7:           if producer has more energy to transfer than consumer
                needs then
8:               Transfer this amount and remove consumer off the list.
9:           else
10:              Transfer totality of remaining producer energy to the
                    consumer.
11:      Remove producer off the list.
12:  finish
```

On a sample of 10000 timeslots, the computation of the real max flow problem compared to the heuristic shows that in 83% of cases, the heuristic gives the same results. On average, the results differ by 3%. One can use this heuristic for the intermediate computation of the max flow problems as it does not modify enough objective functions to change, for example, the ranking of two different solutions.

The following relates to computation time on real data. Our model has been tested with a one-hour time horizon, corresponding to 3600 timeslots, 30 metros and 496 dwell times to optimize. The objective function has a value 8544.4 a.u. at time $t_o$. After 450 iterations, total energy consumption is about 7884.5 a.u, that to say 7.7% saving.

However, a real metro line is subject to minor perturbations that can affect the adherence to the timetable. To check the relevance of the optimization, a random noise has been added on optimized dwell times to quantify the robustness of the objective function. This noise consists in randomly modifying dwell times by ±δs.

TABLE H

| | Noise (s) | | |
|---|---|---|---|
| | 1 | 3 | 6 |
| Average on 100 tries (u.a.) | 7917.6 | 7984.4 | 8029.7 |
| Saving (%) | 7.3 | 6.6 | 6.0 |

Table H shows the results. Even with 6 second noise, the optimization is still saving 6.0% energy. This means that the optimized solution is saving energy, but also all its neighbor solutions.

The following relates to computation times on the departure time benchmark. It has been shown before that the problem can be classified as a (G, d, C−J) whereas another problem may be classified as (PP, D, C−nJ). Actually the data model as well as its implementation allows computation of the latter formulation. Slight modifications are done to the data model to compute this problem. In these modifications, it is possible to show the change of the objective function (3) into:

$$\min_{t \in T} \max y_t$$

Indeed, an objective may be to minimize the energy peak, i.e. minimize the energy consumption of the timeslot of the time period where the energy consumption is maximum.

Additionally, regenerative energy is not considered in the implementation even if the data model was taking it into account. There is then no need to use any attenuation matrix compiling Joule's effect as no energy transfer is possible. In some scenarios, regenerative energy can be transferred in totality to a train consuming energy as long as the two trains are physically in the same electric sub-station network. In this model, electric sub-stations are not coupled and it is impossible to transfer energy from a point in the line belonging to an electric sub-station to a point belonging to another one. The implementation can model that by introducing in the attenuation matrix this topology as follows:

$$A_{i,j} \begin{cases} 1 & \text{if } i \text{ and } j \text{ belong to the same electric sub-station,} \\ 0 & \text{otherwise.} \end{cases}$$

These modifications allow the computation of the initial objective function value based on the given data. However, the searching method using a genetic algorithm fails in optimizing this value. It is understandable in the fact that the genetic algorithm modifies globally the different parameters when an efficient heuristic can choose to modify variables which impact the timeslot where the energy peak exists. Some techniques give a heuristic that search expressly for energy peaks and that try to smooth such peaks.

The aforementioned systems, components, architectures, environments, and the like have been described with respect to interaction between several components and/or elements. Such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein for the sake of brevity, but known by those of skill in the art.

Figure 8:
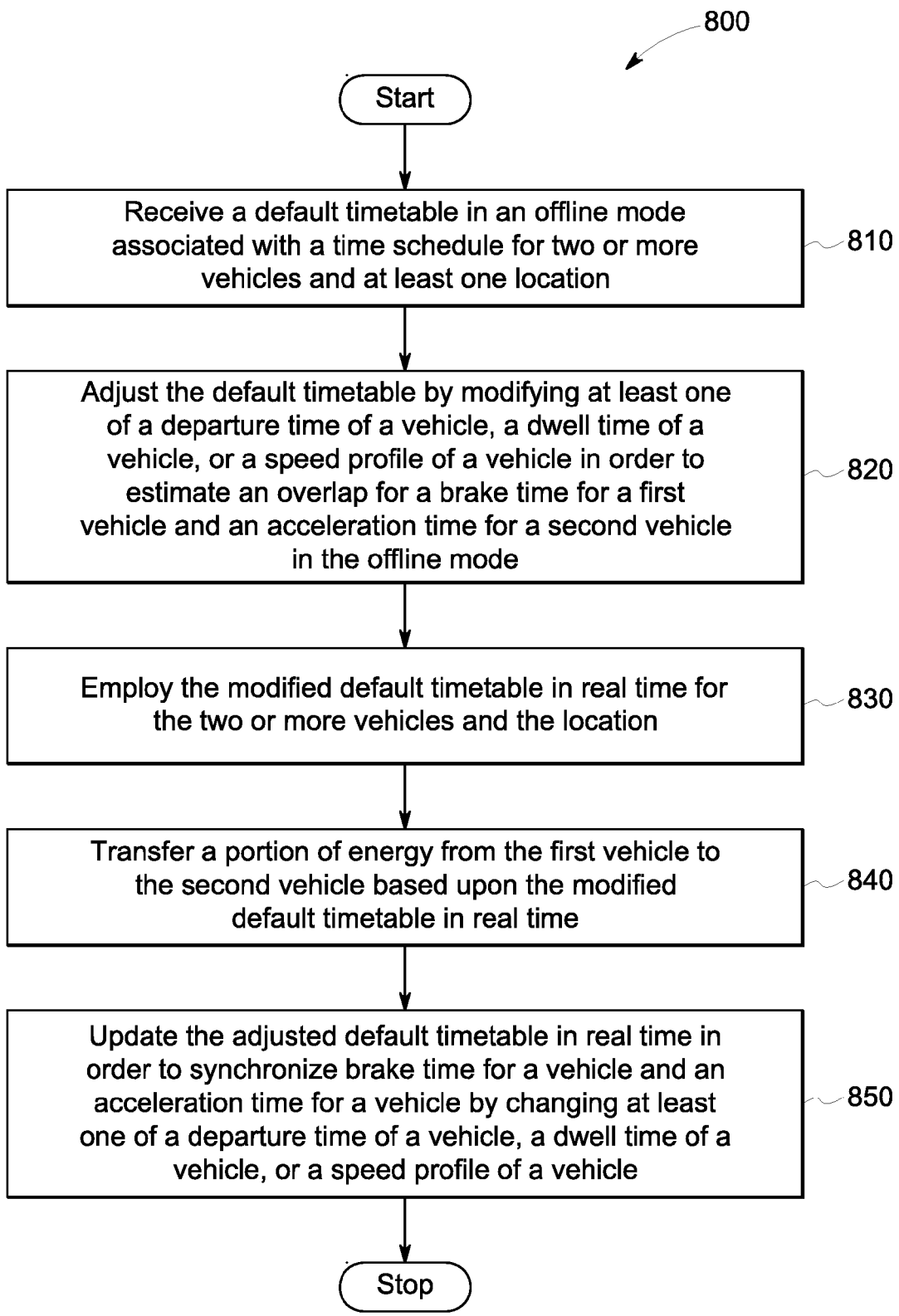
FIG. 8 illustrates a flow chart of an embodiment of a method for modifying a timetable to synchronize a first vehicle and a second vehicle.

In view of the exemplary devices and elements described supra, methodologies that may be implemented in accordance with the disclosed subject matter will be better appreciated with reference to the flow chart of FIG. 8. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow chart of an exemplary embodiment of a method 800. At reference numeral 810, a default timetable can be received in an offline mode, wherein the default timetable can be associated with a time schedule for two or more vehicles and at least one location. At reference numeral 820, the default timetable can be adjusted by modifying at least one of a departure time of a vehicle, a dwell time of a vehicle, or a speed profile of a vehicle to estimate an overlap for a brake time for a first vehicle and an acceleration time for a second vehicle in the offline mode. At reference numeral 830, the modified default timetable can be employed in real time for the two or more vehicles and the location. At reference numeral 840, a portion of energy can be transferred from the first vehicle to the second vehicle based upon the modified default timetable in real time. At reference numeral 850, the adjusted default timetable can be updated in real time to synchronize a brake time for a vehicle and an acceleration time for a vehicle by changing at least of a departure time of a vehicle, a dwell time of a vehicle, or a speed profile of a vehicle.

The method can further include controlling the first vehicle or the second vehicle with a control signal based on the modified default timetable in real time. The method can further include tracking the vehicles in comparison with at least one of the modified timetable or a measured amount of energy, monitoring a threshold value related to the measured amount of energy, and updating the modified timetable based upon the threshold value or the tracking of the vehicles.

Dedicated Greedy Algorithm

The resolution by a genetic algorithm allows the structure of a problem to be eliminated. The advantage of such a meta heuristic is the fact that it can be applied for a large collection of problems without knowing how to solve the problems a priori. However, it is possible to also use the structure of a problem to understand how to optimize it. A dedicated greedy algorithm is discussed next herein which takes advantage of certain properties of a problem to give results that compete with the results obtained with a genetic algorithm.

An objective function may describe an optimization problem which involves minimizing, over a time period represented by a set of time slots, the resulting energy consumption of each time slot. For example, such an objective function may be:

$$\min \sum_{t \in T} v((\mathcal{T}'_{i,t})_{i \in I})$$

where the sum-timetable shift decision problem is (given a timetable $(T_{i,t})$, an energy valuation v, an optimization window matrix Δ, and an objective k) deciding whether there exists a shifted timetable which consumes at least k energy less than the initial one, i.e.:

$$\Sigma_{t \in T} v((T'_{i,t})_{i \in I}) \leq k.$$

Yet, the energy consumption can be decreased only by a better use of the regenerative energy produced when metros are braking. If no consideration is made about the energy attenuation which occurs when transferring some energy from one metro to another, the only way to minimize the global energy consumption is by a better synchronization between moments of braking and moments of accelerations. Therefore, avoiding time slots where metros are braking alone is the key to minimizing energy consumption of the line.

A genetic algorithm can modify the dwell times of a timetable, by adding or removing time slots, in order to minimize the global energy consumption. However, energy savings is due to a better synchronization of the braking and acceleration phases of the metros. Instead of reasoning in terms of dwell times, reasoning may be done in terms of braking and accelerating intervals.

The braking interval $B_{i,s}$ is the $s^{th}$ period of time (corresponding to the $s^{th}$ station) of the metro i, delimited by a starting time slot $Bstart_{i,s}$ and an ending time slot $Bend_{i,s}$ such that:

$$\forall t \in T, (Bstart_{i,s} \leq t \leq Bend_{i,s})^{\hat{}}(e_{i,t}<0)$$

The acceleration interval $A_{i,s}$ is the $s^{th}$ period of time (corresponding to the $s^{th}$ station) of the metro i, delimited by a starting time slot $Astart_{i,s}$ and an ending time slot $Aend_{i,s}$ such that:

$$\forall t \in T, (Astart_{i,s} \leq t \leq Aend_{i,s})^{\hat{}}(e_{i,t}<0)$$

Braking intervals are the periods of time when a given metro produces energy, and acceleration intervals are the periods of time when a given metro consumes energy. In accordance with an embodiment, all the dwell times are immediately followed by an acceleration interval. Indeed, metros stopping at a station will have their dwell phase immediately followed by an acceleration phase to go to the next station. Therefore, if it is supposed that a metro is accelerating once during an interstation trip, then shifting the starting time of an acceleration interval is equivalent to modifying the length of the dwell time related to it.

The idea of the dedicated greedy algorithm is to shift one acceleration interval belonging to the neighborhood of each braking interval of the time horizon such that the synchronization and the use of the regenerative energy is optimized. The neighborhood of a braking interval is defined as the set of acceleration intervals that could be synchronized during at least one time slot if the acceleration intervals are correctly shifted.

$$\mathcal{N}(B_{ii,ss}) = \{\forall i, s, A_{i,s} | Aend_{i,s} + \max(\Delta_{i,s}) > Bstart_{ii,ss} \lor Astart_{i,s} + \min(\Delta_{i,s}) < Bend_{ii,ss}\}$$

Every acceleration interval belonging to the neighborhood of a given braking interval may be shifted for a better synchronization. The shift which should be applied on an acceleration interval is computed to bring closest its starting time to the braking interval's starting time. This shift tends to synchronize the starting time slots of the acceleration interval and its related braking interval. The shift is communicated to the vehicle(s) for controlling movement of the vehicle(s) (e.g., a metro). The acceleration interval, therefore, is delayed or advanced accordingly with the allowed intervals as represented by an optimization window matrix.

$$\text{shift} = \begin{cases} \min(Bstart_{ii,ss} - Astart_{i,s}, \max(\Delta_{i,s})) & \text{if } Bstart_{ii,ss} > Astart_{i,s} \\ \max(Astart_{i,s} - Bstart_{ii,ss}, \min(\Delta_{i,s})) & \text{otherwise} \end{cases}$$

Dedicated Greedy Algorithm

| Require: ordered list of braking intervals, list of acceleration intervals |
| --- |
| 1: for all braking intervals do |
| 2:   Compute the original objective function |
| 3:   Initialize the optimal shift |
| 4:   Initialize the closest acceleration interval |
| 5:   Compute the set of neighbours acceleration intervals |
| 6:   for all acceleration interval in neighbourhood do |
| 7:     Shift the acceleration interval to synchronize it best |
| 8:     Compute the current objective function |
| 9:     if Current objective function < Original objective function then |
| 10:      Original objective function := current objective function |
| 11:      Optimal shift := shift |
| 12:      Closest acceleration interval := acceleration interval |
| 13:     Unshift the acceleration interval |
| 14:   Apply the Optimal shift to the closest acceleration interval |
| 15:   Remove the acceleration interval from the list |
| 16: finish |

The algorithm is greedy because, once an acceleration interval has been shifted, it is removed from the pool of intervals and cannot be shifted any more. From an industrial point of view, the greedy algorithm has the advantage of giving the same output given the same input. The greedy algorithm is safer to use, in a sense, as the greedy algorithm will not surprise the final user who might be puzzled by the non-deterministic solutions given by an evolutionary algorithm. The greedy algorithm is also monotonic and only minimizes the objective function. The greedy algorithm is a useful feature for real-time optimization, as the user is certain not to worsen its current solution. It is then possible to automatically run the greedy algorithm on a real-time instance and let it enhance the current solution as it gets better results. While a genetic algorithm may provide robust, high quality results, the user of a greedy heuristic taking advantage of the structure of the problem allows resolvability in a real-time context, in particular when the problem is to re-optimize the energy consumption after a major incident.

As an example, a timetable, represented by dwell times, interstation times, and departure times in terminals for every train, has been drawn from real data. The timetable represents a nominal business day for a metro line, with respectively 165 and 161 journeys in both directions over the whole day. For every interstation transit (the trip does a metro between two adjacent stations) an energy pattern is provided which compiles, for every time slot, the nominal energy consumed (by convention positive) or produced (by convention negative). These energy patterns have been artificially generated, inspired by real energy curves. Energy units are arbitrary. For example, a value of "1" in this system corresponds to the energy consumed by one metro at full acceleration during one second.

In this example, the time precision for the data is one second, which means that time slots of one second duration are used. The model is restricted to a single metro line (no fork or loops) including 31 stations with two terminals A and B. All trips are done from A to B or B to A, stopping at all stations. Losses due to the Joule effect are compiled in an efficiency matrix which is a table detailing the attenuation during transfer between two points on the line. This attenuation is computed according to the electrical resistance of the third rail.

For every time slot, the position of metros (between which stations they are located) are known. These positions allow the attenuation to be known during the potential transfer of energy between two metros. The computation of the fitness function is done by constructing a timetable using different parameter tables compiling dwell times, interstation times, and so on. This is the dwell times table which include the variables that will be modified by the different resolution algorithms (e.g., genetic and greedy heuristic).

The model has been tested with a one quarter time horizon, corresponding to 900 second time slots, 18 metros, and 122 dwell times (variables) to optimize. The initial value of the fitness function is 2158.3 a.u. The stopping criterion of the genetic algorithm is set as 10 generations without an improvement of the fitness function. The results of the genetic algorithm are the average values of 245 runs. The greedy algorithm has no restart and finishes when the set of acceleration intervals has been shifted. As the computation of the fitness function is the most time consuming, and as the computation time is strongly related to the implementation and the hardware used for the simulations, the number of calls to the fitness function is given as time results.

The following table provides a comparison of the two resolution methods (genetic algorithm and greedy algorithm) for optimizing the global energy consumption.

| Method | Objective function (kJ) | Savings | Objective function calls |
| --- | --- | --- | --- |
| Initial | 2158.3 | — | — |
| GA | 2008.5 | 6.95% | 3225 |
| Greedy | 2037.1 | 5.62% | 460 |

The genetic algorithm gives better results but the time cost is potentially higher. The genetic algorithm is thus a good candidate to optimize off-line timetables, whereas the greedy algorithm is better suited for online optimization.

Figure 13:
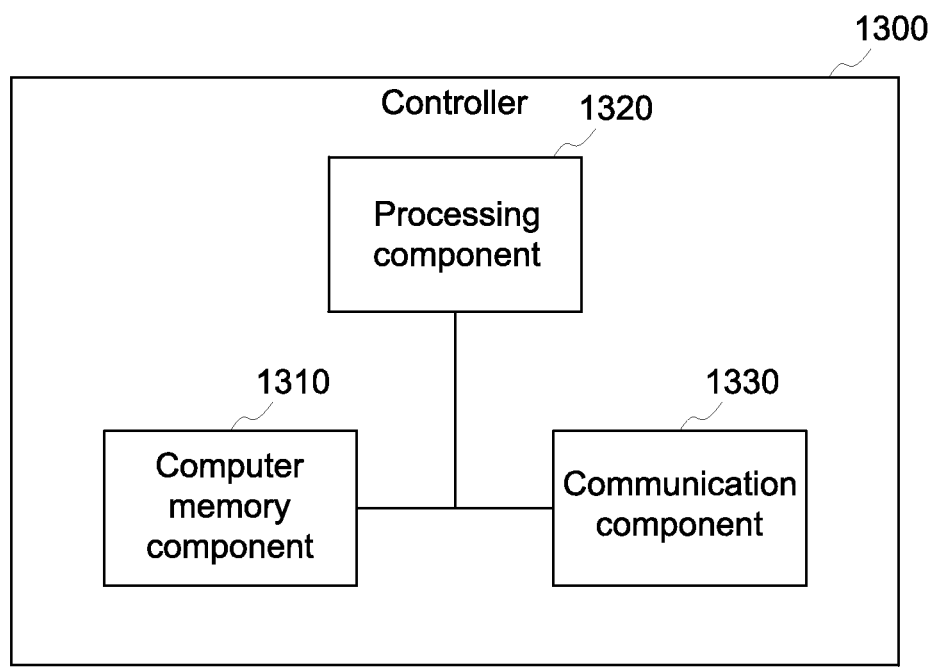
FIG. 13 illustrates an example embodiment of a controller.
Figure 14:
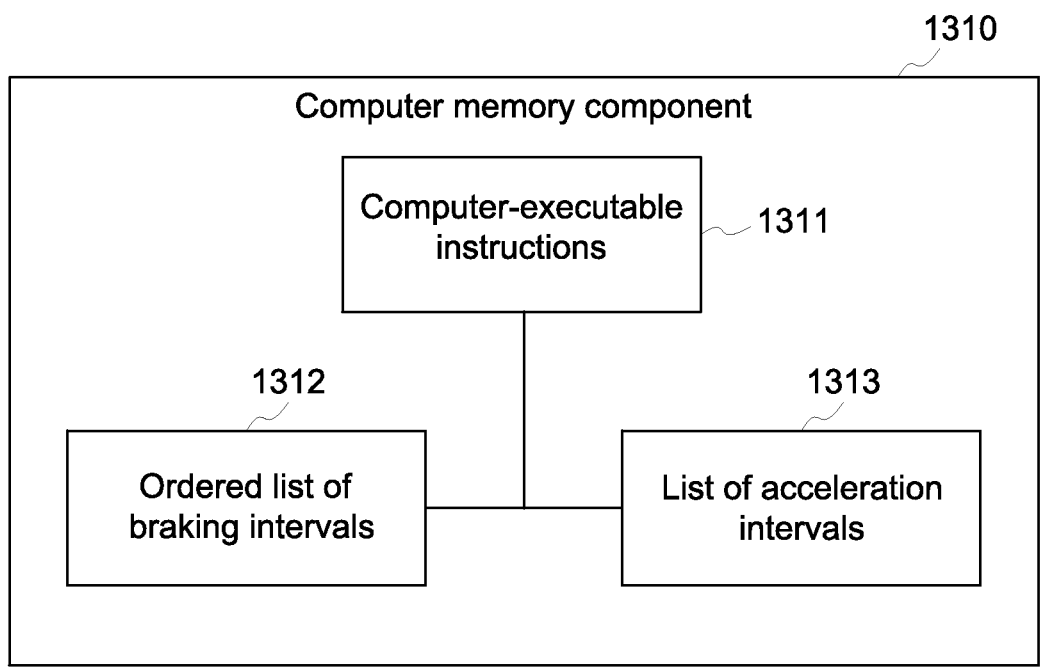
FIG. 14 illustrates an example embodiment of a computer memory component of the controller of FIG. 13.

FIG. 13 illustrates an example embodiment of a controller 1300 implementing the dedicated greedy algorithm. FIG. 14 illustrates an example embodiment of a computer memory component 1310 of the controller 1300 of FIG. 13. In one embodiment, the controller 1300 is provided having a computer memory component 1310 storing a set of computer-executable instructions 1311, an ordered list of braking intervals 1312, and a list of acceleration intervals 1313 for a plurality of vehicles operating on an electric transportation line. The controller 1300 also has a processing component 1320 configured to execute the set of computer-executable instructions 1311 to at least operate on the ordered list of braking intervals 1312 and the list of acceleration intervals 1313 to minimize an energy consumption of the electric transportation line over a determined period of time by shifting one or more acceleration intervals of the list of acceleration intervals in time with respect to one or more braking intervals of the ordered list of braking intervals using the dedicated heuristic greedy algorithm described herein.

The set of computer-executable instructions may include instructions for (for each braking interval of the ordered list) computing an original objective function, initializing an optimal shift, initializing a closest acceleration interval, and computing a set of acceleration intervals in a neighborhood. The set of computer-executable instructions may also include instructions for (for each acceleration interval in a neighborhood) shifting an acceleration interval by a shift amount to synchronize the acceleration interval with the braking interval, and computing a current objective function.

The set of computer-executable instructions may further include instructions for (when the current objective function is less than the original objective function) setting the original objective function to the current objective function, setting the optimal shift to the shift amount, setting the closest acceleration interval to the acceleration interval, and un-shifting the acceleration interval by the shift amount. The set of computer-executable instructions may also include instructions for (for each braking interval of the ordered list) applying the optimal shift to the closest acceleration interval, and removing the acceleration interval from the list of acceleration intervals.

The controller may further have a communication component 1330 configured to communicate the optimal shift to a corresponding vehicle of the plurality of vehicles. The communication component 1330 may be one or more of a wired communication component or a wireless communication component.

Figure 15:
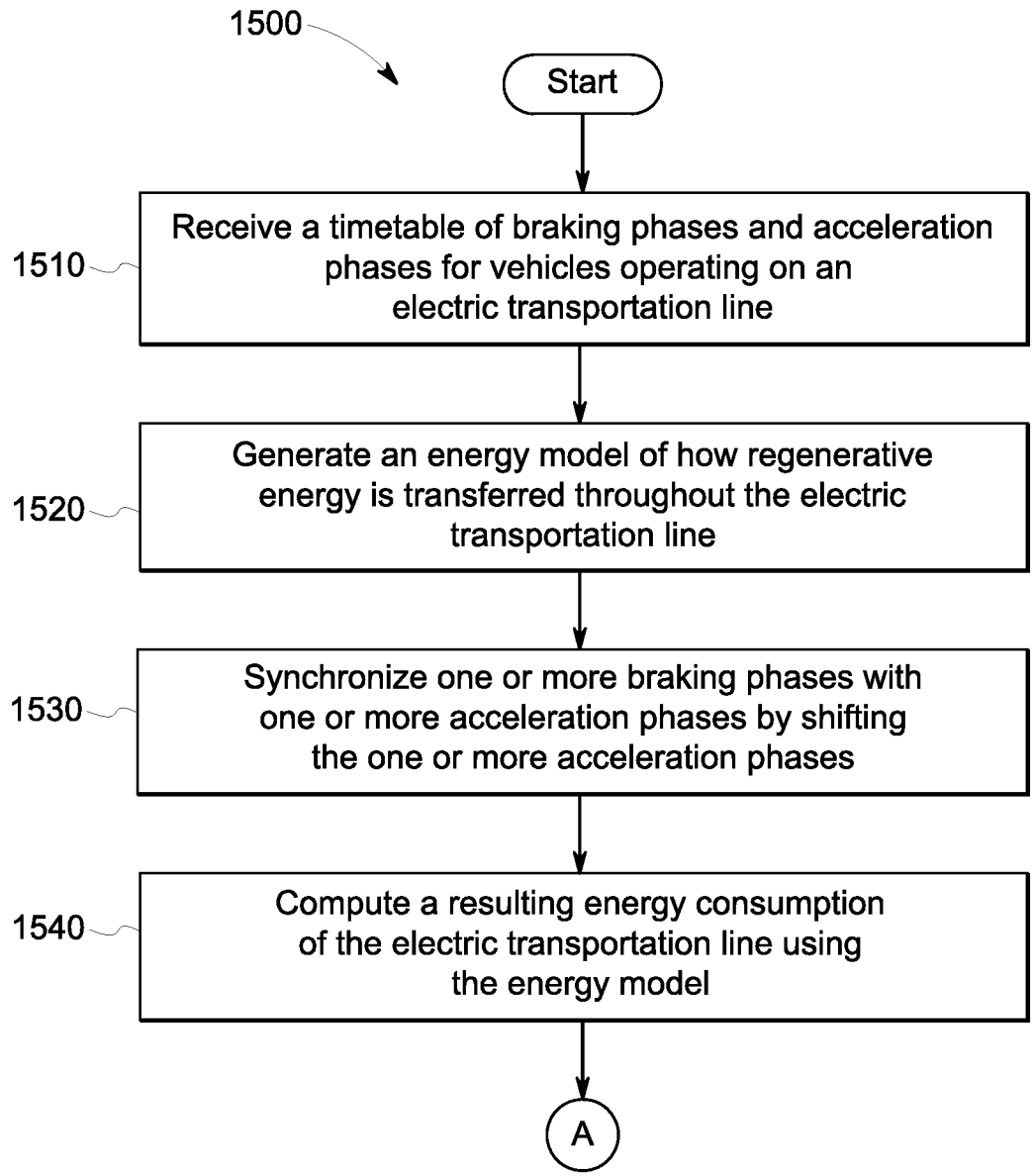
FIG. 15 is a flow chart of an example embodiment of a first part of a method for minimizing an energy consumption of an electric transportation line.
Figure 16:
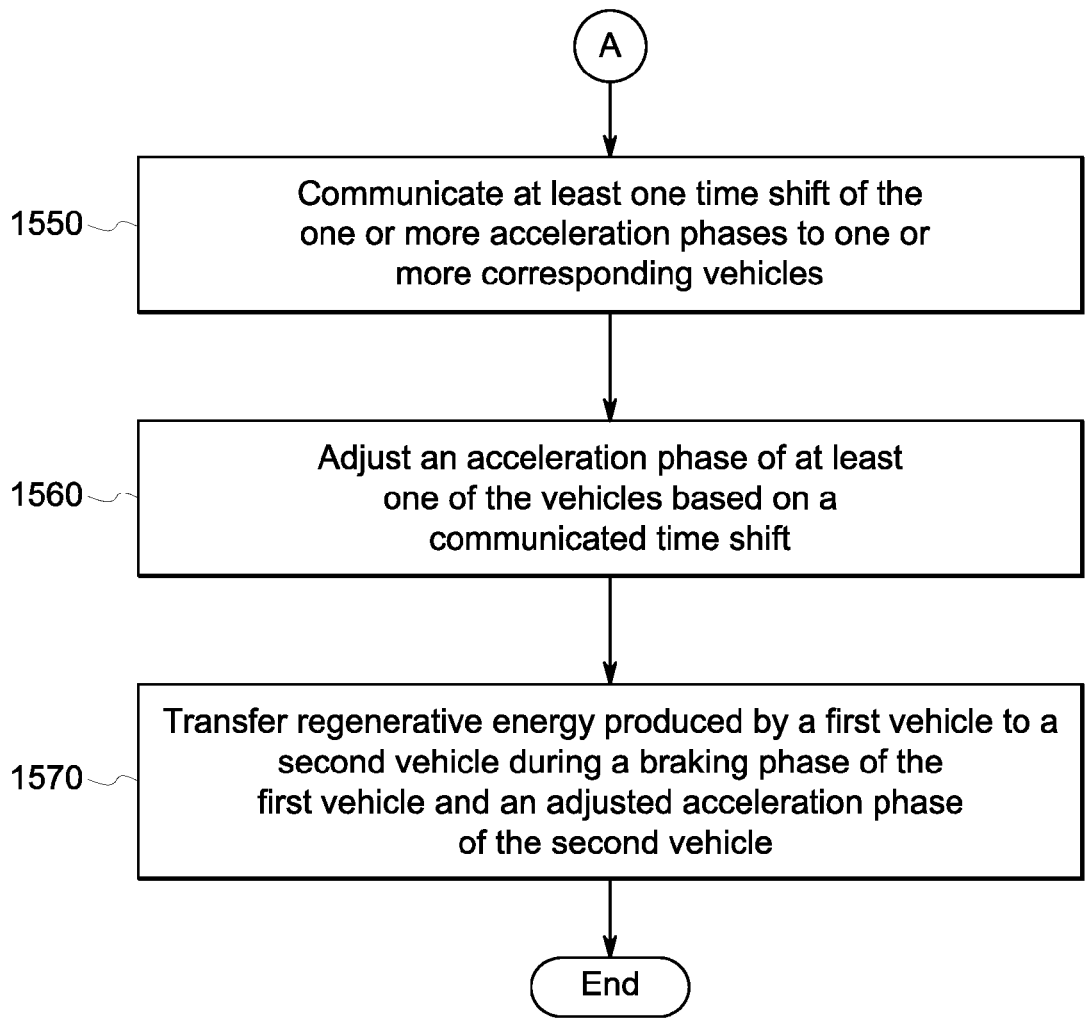
FIG. 16 is a flow chart of an example embodiment of a second part of a method for minimizing an energy consumption of an electric transportation line.

FIG. 15 is a flow chart of an example embodiment of a first part of a method 1500 for minimizing an energy consumption of an electric transportation line using the dedicated greedy algorithm, and FIG. 16 is a flow chart of an example embodiment of a second part of the method 1500 for minimizing an energy consumption of an electric transportation line using the dedicated greedy algorithm. In one embodiment, the method 1500 is provided including the method step 1510 of receiving a timetable in a controller, where the timetable is associated with a time schedule of braking phases and acceleration phases for a plurality of vehicles operating on an electric transportation line. The method also includes the step 1520 of generating an energy model using the controller, where the energy model is associated with the timetable and formalizes how regenerative energy is transferred throughout the electric transportation line. The method further includes the step 1530 of synchronizing one or more of the braking phases of the plurality of vehicles with one or more of the acceleration phases of the plurality of vehicles during a determined period of time of operation of the plurality of vehicles on the electric transportation line by shifting the one or more acceleration phases in time, using the controller.

The method may also include the step 1540 of computing a resulting energy consumption of the electric transportation line over the determined period of time, using the energy model on the controller, based on how regenerative energy produced by the plurality of vehicles is spread through the electric transportation line, and based on how much of the regenerative energy is reused by the plurality of vehicles in response to the shifting of the one or more acceleration phases. The energy model relates to at least one of a network topology for the electric transportation line, an ohmic resistance energy loss, an equipment energy loss, and an energy transfer between at least two of a first vehicle of the plurality of vehicles, a second vehicle of the plurality of vehicles, a track associated with the first vehicle, and a track associated with the second vehicle.

The method may further include the step 1550 of communicating at least one time shift of the one or more acceleration phases from the controller to one or more corresponding vehicles of the plurality of vehicles, and the step 1560 of at least one of the plurality of vehicles adjusting an acceleration phase based on a communicated time shift. The method may also include the step 1570 of transferring regenerative energy produced by a first vehicle of the plurality of vehicles to a second vehicle of the plurality of vehicles during a braking phase of the first vehicle and an adjusted acceleration phase of the second vehicle.

In one embodiment, a system 1700 is provided having an electric transportation line 1710 having a plurality of stations or terminals 1720, and a plurality of vehicles 1730 (e.g., metros) configured to operate on the electric transportation line 1710. Vehicles on a first track 1711 of the transportation line move in a clockwise direction and vehicles on a second track 1712 of the transportation line move in a counterclockwise direction, as if looking down at the transportation line 1710 from above. The system also has a controller 1300 configured to process the ordered list of braking intervals 1312 and the list of acceleration intervals 1313 associated with the plurality of vehicles 1730 to determine shifts in time of one or more of the acceleration intervals with respect to one or more of the braking intervals that result in a reduced consumption of energy by the electric transportation line 1710 over a determined period of time in accordance with the dedicated greedy algorithm.

Figure 17:
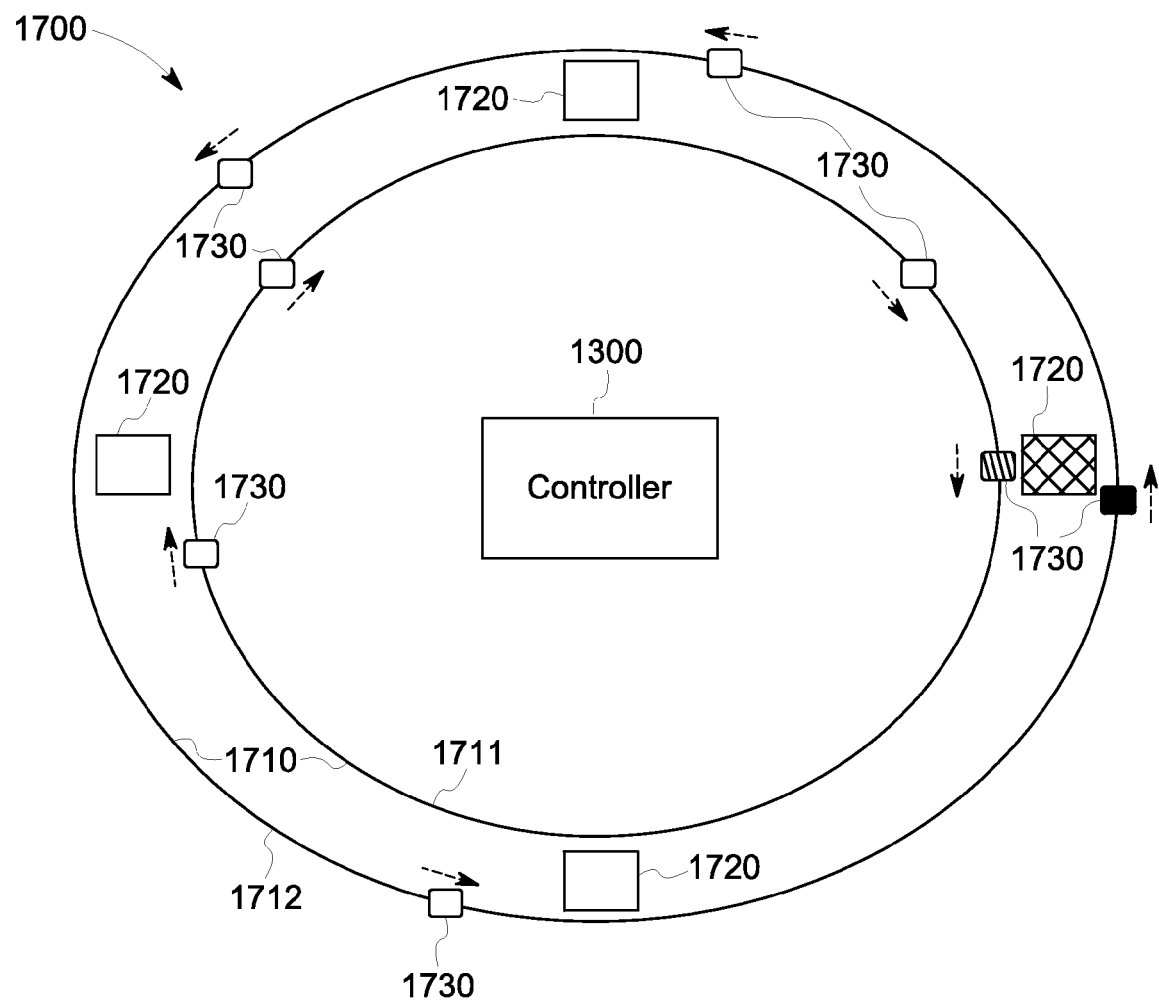
FIG. 17 illustrates an example embodiment of a system using the controller of FIG. 13 to implement the method of FIGS. 15-16.

For example, the acceleration interval for the first vehicle 1730 (i.e., a first metro shown in FIG. 17 as having a light shading) may be shifted (adjusted) to synchronize with the braking interval for the vehicle 1730 (i.e., a second metro shown in FIG. 17 has having a dark shading). In this manner, as the second metro brakes to arrive at the station 1720 (i.e., the station shown in cross hatch in FIG. 17), the first metro accelerates to leave the station. During the braking interval of the second metro, regenerative energy is produced and transferred through the transportation line 1710 to the first metro during the shifted (i.e., synchronized) acceleration interval. In accordance with an embodiment, the dedicated greedy algorithm, as described herein, determines the appropriate shifts of the acceleration intervals for the various vehicles (metros) to minimize the overall energy consumed by the electric transportation line.

As such, the controller is configured to relate a braking interval of the ordered list to a set of acceleration intervals of the list of acceleration intervals in a neighborhood of the braking interval. The neighborhood includes all acceleration intervals of the list of acceleration intervals that occur in a same time space as the braking interval. The controller is further configured to select an acceleration interval of the neighborhood and shift the acceleration interval with respect to the braking interval such that a local energy consumption is minimized, and remove the acceleration interval from the list of acceleration intervals.

The controller employs an energy model and the dedicated heuristic greedy algorithm to determine the shifts in time of one or more of the acceleration intervals with respect to one or more of the braking intervals that result in the reduced consumption of energy. The controller is also configured to communicate the shifts in time to corresponding vehicles of the plurality of vehicles. At least a portion of the reduced consumption of energy results from a transfer of regenerative energy produced by a first vehicle of the plurality of vehicles during a braking interval to a second vehicle of the plurality of vehicles during an acceleration interval.

In accordance with an embodiment, the dedicated heuristic greedy algorithm provides the computation of an objective function that includes minimizing, over the determined period of time as represented by a set of time slots, a resulting energy consumption of each time slot. The energy model relates to at least one of a network topology for the electric transportation line, an ohmic resistance energy loss, an equipment energy loss, and an energy transfer between at least two of a first vehicle of the plurality of vehicles, a second vehicle of the plurality of vehicles, a track associated with the first vehicle, and a track associated with the second vehicle.

In any of the embodiments of systems and methods herein, shifting one or more acceleration intervals of a list of acceleration intervals in time with respect to one or more braking intervals may comprise shifting the one or more acceleration intervals in time such that they overlap in time with the one or more braking intervals.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not different from the literal language of the claims, or if they include equivalent structural elements with insubstantial differences from the literal language of the claims.

What is claimed is:

1. A controller, comprising:
a non-transitory computer memory component storing a set of computer-executable instructions, a list of braking intervals for a plurality of vehicles operating on an electric transportation line, and a list of acceleration intervals for the plurality of vehicles; and
a processing component configured to execute the set of computer-executable instructions to at least operate on the list of braking intervals and the list of acceleration intervals to reduce an energy consumption of the electric transportation line over a period of time by shifting one or more acceleration intervals of the list of acceleration intervals in time with respect to one or more braking intervals of the list of braking intervals.

2. The controller of claim 1, wherein the set of computer-executable instructions includes instructions, for each braking interval of the list of braking intervals, for:
  computing an original objective function for reducing energy consumption for the current braking interval under consideration;
  initially designating an optimal shift for an acceleration interval associated with the current braking interval;
  initially designating an acceleration interval as a closest acceleration interval associated with the current braking interval; and
  computing a set of acceleration intervals in a neighborhood of the current braking interval.

3. The controller of claim 2, wherein the set of computer-executable instructions further includes instructions, for each acceleration interval in the set of acceleration intervals in the neighborhood, for:
  shifting a current acceleration interval under consideration by a shift amount to synchronize the current acceleration interval with the current braking interval; and
  computing a current objective function for reducing energy for the current braking interval based on at least the shifted current acceleration interval.

4. The controller of claim 3, wherein the set of computer-executable instructions further includes instructions, for each acceleration interval in the set of acceleration intervals in the neighborhood, for:
  when the current objective function is less than the original objective function:
    setting the original objective function to the current objective function;
    setting the optimal shift to the shift amount;
    setting the closest acceleration interval to the current acceleration interval under consideration; and
    un-shifting the current acceleration interval by the shift amount.

5. The controller of claim 4, wherein the set of computer-executable instructions further includes instructions, for each braking interval of the list of braking intervals, for:
  applying the optimal shift to the closest acceleration interval.

6. The controller of claim 5, further comprising a communication component configured to communicate the optimal shift to a corresponding vehicle of the plurality of vehicles.

7. The controller of claim 1, further comprising a communication component configured to control communication of signals to the vehicles for controlling movement of the vehicles according to the one or more acceleration intervals that are shifted in time with respect to the one or more braking intervals.

8. A method, comprising:
  receiving a timetable in a controller, where the timetable is associated with a time schedule of braking intervals and acceleration intervals for a plurality of vehicles operating on an electric transportation line;
  generating an energy model using the controller, where the energy model is associated with the timetable and relates to how regenerative energy is transferred throughout the electric transportation line; and
  synchronizing one or more of the braking intervals of the plurality of vehicles with one or more of the acceleration intervals of the plurality of vehicles during a period of time of operation of the plurality of vehicles on the electric transportation line by shifting the one or more acceleration intervals in time, using the controller, based at least in part on the energy model.

9. The method of claim 8, further comprising computing a resulting energy consumption of the electric transportation line over the period of time, using the energy model on the controller, based on how regenerative energy produced by the plurality of vehicles is spread through the electric transportation line, and based on how much of the regenerative energy is reused by the plurality of vehicles in response to the shifting of the one or more acceleration intervals.

10. The method of claim 8, wherein the energy model relates to at least one of a network topology for the electric transportation line, an ohmic resistance energy loss, an equipment energy loss, or an energy transfer between at least two of a first vehicle of the plurality of vehicles, a second vehicle of the plurality of vehicles, a track associated with the first vehicle, and a track associated with the second vehicle.

11. The method of claim 8, further comprising communicating at least one time shift of the one or more acceleration intervals from the controller to one or more corresponding vehicles of the plurality of vehicles.

12. The method of claim 11, further comprising at least a first vehicle of the one or more corresponding vehicles of the plurality of vehicles adjusting a respective acceleration phase based on the at least one time shift that is communicated.

13. The method of claim 12, further comprising transferring regenerative energy produced by a second vehicle of the plurality of vehicles to the first vehicle during a braking phase of the second vehicle and an adjusted acceleration phase of the first vehicle.

14. A system, comprising:
  a controller configured to process a list of braking intervals and a list of acceleration intervals associated with a plurality of vehicles configured to operate on an electric transportation line to determine shifts in time of one or more of the acceleration intervals with respect to one or more of the braking intervals that result in a reduced consumption of energy by the electric transportation line over a period of time; and
  a communication component configured for operable coupling with the controller and to control communication of the shifts in time determined by the controller to the vehicles, for controlling movement of the vehicles.

15. The system of claim 14, wherein the controller is configured to:
  relate a first braking interval of the list of braking intervals to a set of acceleration intervals of the list of acceleration intervals in a neighborhood of the first braking interval, wherein the neighborhood includes all acceleration intervals of the list of acceleration intervals that occur in a same time space as the first braking interval;
  select an acceleration interval of the neighborhood and shift the acceleration interval that is selected with respect to the first braking interval such that a local energy consumption is reduced; and
  remove the acceleration interval that is selected from the list of acceleration intervals.

16. The system of claim 14, wherein the controller is configured to employ an energy model and a heuristic greedy algorithm to determine the shifts in time of the one or more of the acceleration intervals with respect to the one or more of the braking intervals that result in the reduced consumption of energy.

17. The system of claim 16, wherein the heuristic greedy algorithm provides the computation of an objective function that includes minimizing, over the determined period of time as represented by a set of time slots, a resulting energy consumption of each time slot.

18. The system of claim 16, wherein the energy model relates to at least one of a network topology for the electric transportation line, an ohmic resistance energy loss, and equipment energy loss, or an energy transfer between at least two of a first vehicle of the plurality of vehicles, a second vehicle of the plurality of vehicles, a track associated with the first vehicle, and a track associated with the second vehicle.

19. The system of claim 14, wherein at least a portion of the reduced consumption of energy results from a transfer of regenerative energy produced by a first vehicle of the plurality of vehicles during a braking interval to a second vehicle of the plurality of vehicles during an acceleration interval.

20. A method comprising:
processing, with a controller, a list of braking intervals and a list of acceleration intervals associated with a plurality of vehicles configured to operate on an electric transportation line to determine shifts in time of one or more of the acceleration intervals with respect to one or more of the braking intervals that result in a reduced consumption of energy by the electric transportation line over a period of time; and
communicating to the vehicles, with a communication component operably coupled to the controller, information of the shifts in time determined by the controller, for controlling movement of the vehicles.

* * * * *